US012322541B2

(12) United States Patent
Jitaru

(10) Patent No.: US 12,322,541 B2

(45) **Date of Patent: *Jun. 3, 2025**

(54) MAGNETIC STRUCTURES FOR LOW LEAKAGE INDUCTANCE AND VERY HIGH EFFICIENCY

(71) Applicant: Rompower Technology Holdings, LLC, Milford, DE (US)

(72) Inventor: Ionel Jitaru, Tucson, AZ (US)

(73) Assignee: Rompower Technology Holdings, LLC, Milford, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/368,513

(22) Filed: Sep. 14, 2023

(65) Prior Publication Data

US 2024/0006119 A1 Jan. 4, 2024

Related U.S. Application Data

(63) Continuation of application No. 17/845,609, filed on Jun. 21, 2022, now Pat. No. 11,763,984, which is a (Continued)

(51) Int. Cl.

*H01F 27/28* (2006.01)
*H01F 27/245* (2006.01)
*H01F 30/06* (2006.01)

(52) U.S. Cl.

CPC ........... *H01F 30/06* (2013.01); *H01F 27/245* (2013.01)

(58) Field of Classification Search

CPC ...... H01F 27/40; H01F 27/2804; H01F 27/29; H01F 2027/408; G11C 11/06

(Continued)

(56) References Cited

U.S. PATENT DOCUMENTS

2005/0024179 A1* 2/2005 Chandrasekaran ..... H01F 27/24 336/212
2005/0110606 A1* 5/2005 Vinciarelli .......... H01F 27/2804 336/200

(Continued)

*Primary Examiner* — Shawki S Ismail
*Assistant Examiner* — Kazi S Hossain
(74) *Attorney, Agent, or Firm* — Thomas W. Galvani, P.C.; Thomas W. Galvani

(57) ABSTRACT

A magnetic and electrical circuit element including magnetic-flux-conducting posts, and a multi-layer structure formed with an electrically-conductive material. The multi-layer structure includes multiple layers forming a stack of layers along a length of the posts, said multi-layer structure configured as primary and secondary windings of a transformer. The primary winding is embedded in the multi-layer structure and wound around the magnetic-flux-conducting posts in such a way that a magnetic field induced in each of the magnetic-flux-conducting posts has a magnetic field polarity opposite to a polarity of the respective magnetic field of the magnetic-flux-conducting post adjacent the respective magnetic-flux-conducting post. Around each of the magnetic-flux-conducting posts, there is a respective one of the secondary windings connected to a semiconductor device. The magnetic-flux-conducting posts are connected magnetically by continuous magnetic-flux-conducting plates, each of which is shaped to ensure a continuous flow of the magnetic field successively through adjacent magnetic-flux-conducting posts.

11 Claims, 42 Drawing Sheets

Related U.S. Application Data continuation of application No. 17/189,096, filed on Mar. 1, 2021, now Pat. No. 11,367,565, which is a continuation-in-part of application No. 16/368,186, filed on Mar. 28, 2019, now Pat. No. 10,937,590, which is a continuation of application No. 14/660,901, filed on Mar. 17, 2015, now abandoned.

(60) Provisional application No. 63/133,076, filed on Dec. 31, 2020, provisional application No. 61/955,640, filed on Mar. 19, 2014.

(58) Field of Classification Search
USPC ................................ 336/200, 232, 223, 184
See application file for complete search history.

(56) References Cited

U.S. PATENT DOCUMENTS

| | | | | |
|---|---|---|---|---|
| 2008/0024255 | A1* | 1/2008 | Sano | H01F 17/045<br>335/297 |
| 2010/0232181 | A1* | 9/2010 | Nakahori | H01F 27/2804<br>336/221 |

* cited by examiner

Prior Art
US PATENT 4,665,357

Prior Art
US PATENT 7,295,093 B2

Layer 3

Layer 4

MAGNETIC STRUCTURES FOR LOW LEAKAGE INDUCTANCE AND VERY HIGH EFFICIENCY

CROSS-REFERENCE TO RELATED APPLICATIONS

This application is a continuation of and claims the benefit of prior U.S. patent application Ser. No. 17/845,609, filed Mar. 21, 2022, which is a continuation of and claims the benefit of prior U.S. patent application Ser. No. 17/189,096, filed Mar. 1, 2021, which is a continuation-in-part of and claims the benefit of prior U.S. patent application Ser. No. 16/368,186, filed Mar. 28, 2019, which is a continuation of and claims the benefit of prior U.S. patent application Ser. No. 14/660,901, filed Mar. 17, 2015, which claims the benefit of U.S. Provisional Application No. 61/955,640, filed Mar. 19, 2014, all of which are hereby incorporated by reference in their entireties. Prior U.S. patent application Ser. No. 17/189,096 also claims the benefit of U.S. Provisional Application No. 63/133,076, filed Dec. 31, 2020, which is hereby incorporated by reference in its entirety.

FIELD

The present invention relates generally to electronic devices, and more particularly to magnetic structures in power converters.

BACKGROUND

There is an industry demand for smaller size and lower profile power converters, which require smaller and lower profile magnetic elements such as transformers and inductors. For better consistency in production for magnetic elements, the windings are often embedded into multilayer PCB structures. In such applications, copper thickness is limited. To be able to use thinner copper and limited numbers of layers for higher current applications, there are several solutions. One solution is to split the current and process each section of it before the output. The progress in semiconductor industry wherein the footprint of some power devices became very small and the on resistance very small has also shifted the direction in the magnetic technology. The semiconductor devices are capable to process very high currents in a small footprint due to a significant reduction of the on resistance. This requires magnetic structures capable of handling very high current in a very small footprint. To reduce the power dissipation in the copper, especially in the multilayer construction in which very thin copper is used, the length of the magnetic winding is often reduced. FIG. 1 shows two prior art methods of splitting the current. One is described in U.S. Pat. No. 4,665,357, in which there are multiple independent transformers with the primary in series, referred also as a Matrix transformer. Another methodology is described in U.S. Pat. No. 7,295,094.

SUMMARY

In an embodiment, a magnetic and electrical circuit element including magnetic-flux-conducting posts, and a multi-layer structure formed with an electrically-conductive material. The multi-layer structure includes multiple layers forming a stack of layers along a length of the posts, said multi-layer structure configured as primary and secondary windings of a transformer. The primary winding is embedded in the multi-layer structure and wound around the magnetic-flux-conducting posts in such a way that a magnetic field induced in each of the magnetic-flux-conducting posts has a magnetic field polarity opposite to a polarity of the respective magnetic field of the magnetic-flux-conducting post adjacent the respective magnetic-flux-conducting post. Around each of the magnetic-flux-conducting posts, there is a respective one of the secondary windings connected to a semiconductor device. The magnetic-flux-conducting posts are connected magnetically together by continuous magnetic-flux-conducting plates, each of which is shaped to ensure a continuous flow of the magnetic field successively through adjacent magnetic-flux-conducting posts.

In some embodiments, a current flowing through the secondary windings cancels the magnetic field induced in the magnetic-flux-conducting posts by a current flowing through the primary winding.

In some embodiments, the primary winding is connected to a semiconductor device.

In some embodiments, a continuous ring, made of a conductive material, encircles from outside all of the magnetic-flux-conducting posts. The current flows through the semiconductor devices to the continuous ring, and each semiconductor device is connected to copper pads placed between adjacent magnetic-flux-conducting posts, wherein the current flowing through the semiconductor devices encircles each of the magnetic-flux-conducting posts.

In some embodiments, a ring, made of conductive material, encircles all of the magnetic-flux-conducting posts. The current flows through the semiconductor devices to the continuous ring, and each semiconductor device is connected to copper pads placed between two adjacent magnetic-flux-conducting posts, wherein the current flowing through the semiconductor devices encircles both of the adjacent magnetic-flux-conducting posts.

In some embodiments, the copper pads are contained in at least two layers of the multi-layer structure, and the current flows through the copper pads.

In some embodiments, the current flows through electrically conductive pads freely to form an optimum path to cancel the magnetic field induced in the magnetic-flux-conducting posts by the current flowing through the primary winding.

In some embodiments, a current injection winding is wound around each of the magnetic-flux-conducting posts on the optimum path of the current flowing through the semiconductor devices. Summary will be written here. It will repeat the claims in prose, once the claims are finalized.

In an embodiment, a magnetic circuit element includes at least two identical magnetic-flux-conducting posts, and a multi-layer structure formed with an electrically-conductive material. The multi-layer structure includes multiple layers forming a stack of layers along a length of the posts, said multi-layer structure configured as windings of an inductor. The windings of the inductor are wound around the magnetic-flux-conducting posts in such a way that a magnetic field induced in each of the magnetic-flux-conducting posts has a magnetic field polarity opposite to a polarity of the respective magnetic field of the magnetic-flux-conducting post adjacent the respective magnetic-flux-conducting post. The magnetic-flux-conducting posts are connected magnetically together by two continuous magnetic-flux-conducting plates, each shaped to ensure a continuous flow of the magnetic field successively through adjacent magnetic-flux-conducting posts.

In some embodiments, around each of the magnetic-flux-conducting posts, there is an auxiliary winding connected to the respective semiconductor device.

In some embodiments, the auxiliary winding is a current injection winding.

In an embodiment, a magnetic and electrical circuit element includes at least two identical inner posts placed in a line, and at least two outer posts placed in the line outside of the inner posts, flanking the inner posts in the line. The inner and outer posts each have a cross-section, wherein the cross-section of the outer posts ranges from half of to equal to the cross-section of the inner posts. A multi-layer structure is formed with an electrically-conductive material; the multi-layer structure includes multiple layers forming a stack of layers along a length of the posts, and the multi-layer structure is configured as primary and secondary windings of a transformer. The primary winding is embedded in the multi-layer structure and wound around the inner posts in such a way that the magnetic field induced in each of the inner posts has a magnetic field polarity opposite to a polarity of the respective magnetic field of the post adjacent the respective inner post. Around each of the inner posts, there is a secondary winding connected to a semiconductor device. The inner and outer posts are connected magnetically together by two continuous magnetic-flux-conducting plates, each shaped to ensure a continuous flow of the magnetic field successively through adjacent inner and outer posts. A current flowing through the secondary windings cancels the magnetic field induced in the inner posts by the current flowing through the primary winding.

In some embodiments, the primary winding is connected to a semiconductor device.

In some embodiments, the secondary windings are wound around at least a pair of the inner posts in opposite directions and are in parallel.

In some embodiments, the primary winding is wound around at least a pair of the inner posts in opposite directions and is in parallel.

In some embodiments, the secondary windings are wound around at least a pair of the inner posts in opposite directions and are in parallel.

In an embodiment, a magnetic circuit element includes at least two identical inner posts placed in a line, and at least two outer posts placed in the line outside of the inner posts, flanking the inner posts in the line. The inner and outer posts each have a cross-section, wherein the cross-section of the outer posts ranges from half of to equal to the cross-section of the inner posts. A multi-layer structure is formed with an electrically-conductive material. The multi-layer structure includes multiple layers forming a stack of layers along a length of the posts, said multi-layer structure configured as windings of an inductive element. The inductive element winding is embedded in the multi-layer structure and wound around the inner posts in such a way that the magnetic field induced in each of the inner posts has a magnetic field polarity opposite to a polarity of the respective magnetic field of the post adjacent the respective inner post.

The inner and outer posts are connected magnetically together by two continuous magnetic-flux-conducting plates, each shaped to ensure a continuous flow of the magnetic field successively through adjacent inner and outer posts.

In some embodiments, around each of the posts, there is a current injection winding connected to a semiconductor device.

BRIEF DESCRIPTION OF THE DRAWINGS

Referring to the drawings.

DETAILED DESCRIPTION

Embodiments of FIGS. 1-17

Figure 1:
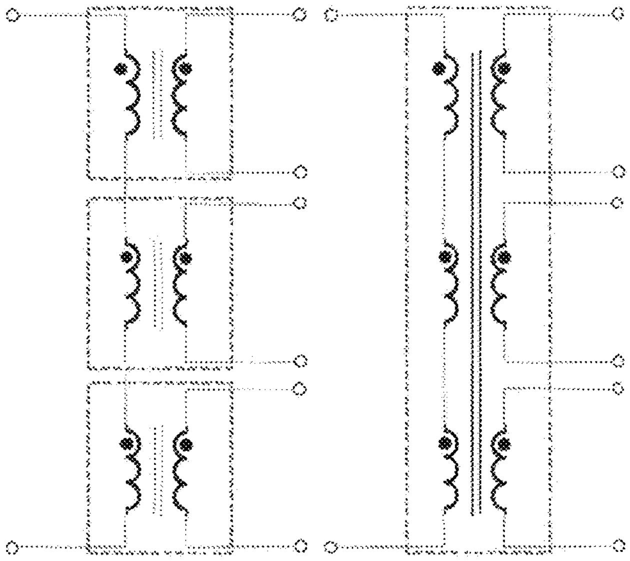
FIG. 1 shows prior art distributed magnetic structures using a multitude of the magnetic elements wherein the primaries are placed in series.
Figure 2:
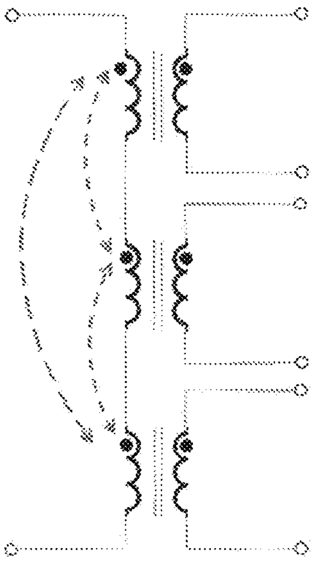
FIG. 2 shows an equivalent schematic of a preferred embodiment wherein the magnetic elements are coupled.
Figure 3A:
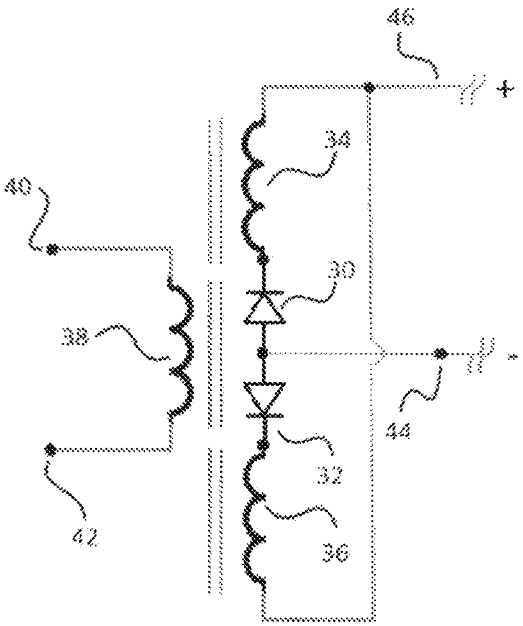
FIG. 3A depicts a transformer, employing a center tap including the rectifiers.
Figure 3B:
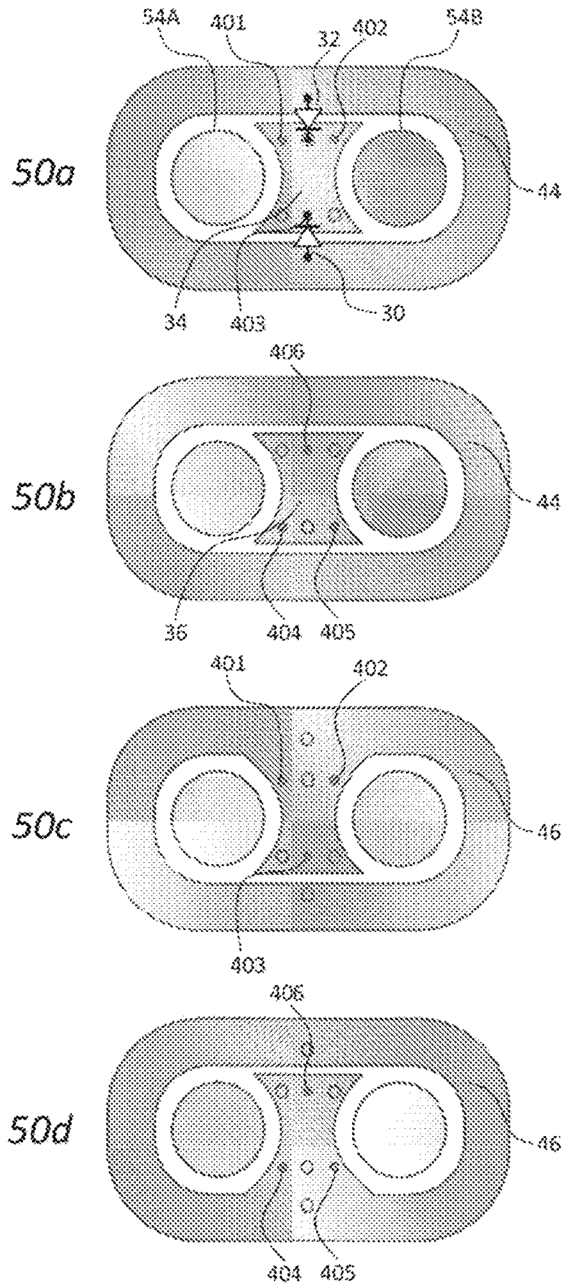
FIG. 3B shows the secondary winding implementation of the transformer presented in FIG. 3A, with a transformer structure using a U core.

Presented in FIG. 3A is a center tap transformer structure having a primary winding 38, and two identical secondary windings 34 and 36. In the secondary side, there are two rectifier means, 30 and 32. The secondary rectifier means can be Schottky diodes, synchronous rectifier using silicon power Mosfets, GANs or other technologies. There is a positive output 46, and a negative output 44. Typically, the negative output it might be connected to the output ground. In the primary, an AC signal is applied to the primary winding between 40 and 42, which can be generated, by a full bridge configuration, half bridge or other topologies. In one of the polarities generated by the signal applied to the primary winding 38, one of the rectifiers means conducts and when the polarity changes the other rectifier means will conduct. Because only one of the secondary winding is conducting current during each polarity the copper in the secondary is not fully utilized. This is one of the major disadvantages of the center tap topology. In addition to that, in center tap topologies there is a leakage inductance between the two secondary windings, which will delay the current flow from a winding to another. In the present embodiment described in FIG. 3B these two drawbacks associated with center tap are minimized. In FIG. 3B are presented four layers of a multilayer structure, from 50*a* through 50*d*, wherein the secondary winding is implemented. A U core shape magnetic core penetrates through the multilayer PCB through the cutout 54A and 54B. In between the legs of the magnetic core there is a conductive material, usually copper connected to the cathodes of the rectifier means, one on layer 50A connected to the cathode of 30 and another one placed on layer 50*b* connected to the rectifier means 32. On layer 50*c* and 50*d* there, the cutouts 54A and 54B are surrounded by conductive material, which is connected to 46. On layer 50*a* and 50 *b* there is a ring of conductive material, which is connected to the anode of the rectifier, means 44.

During one of the polarities when the rectifier means 30 conducts the current flows through the conductive material between the legs of the U core from the anode connected to 44 and through the rectifier means, 30, and further through the vias 401 and 402 on layer 50*c* to the 46. Another path for current flow is through the rectifier means 30 and via 403 and further towards 46. During the polarity wherein rectifier means 32 is conducting, the current will flow from 44, through 32, and further on layer 50*b* through the conductive material, 36, placed between the cutouts, 54A and 54B, and further through via 404 and 405 to layer 50*d* towards 46. Another path for the current flowing through 32 is through via 406 to layer 50*d* and through the conductive material in between the cutouts 54A and 54B towards 46. Though one turn secondary for this magnetic structure will circle the 54A and 54B, the portion of the secondary wherein the current is flowing in only one direction is reduced the conductive material between the cutouts, 54A and 54B, such as 34 and 36. For the rest of the one turn secondary such as the portion of 44 and 46, which surrounds the cutouts 54A, and 54B the current is flowing in both directions. This means that the copper utilization it improved by comparison with more traditional winding technique wherein the entire secondary winding is conducting during only during one polarity.

Another advantage of the winding structure presented in FIG. 3B is the fact that the copper is placed over the entire section of the primary windings allowing the current to flow in order to cancel the magnetic field produced by the primary winding. In addition to that, the rectifier means 32 and 30 are placed as the part of the secondary winding eliminating the end effect losses and reducing the stray inductance.

Figure 4A:
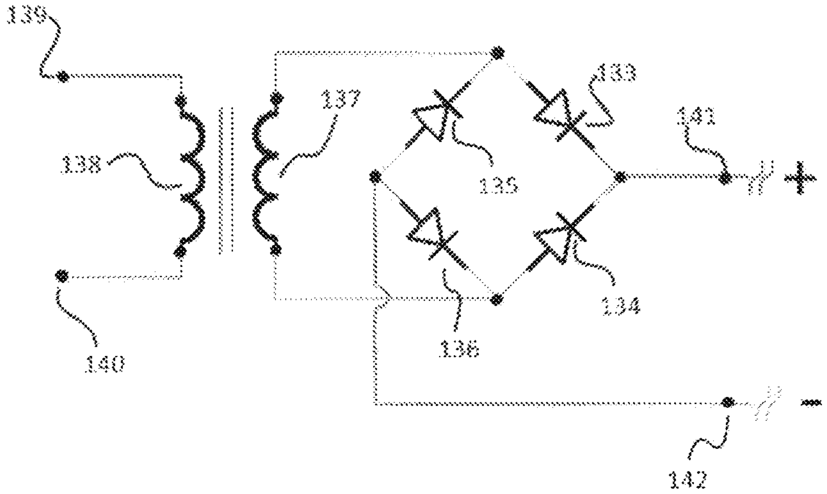
FIG. 4A shows a transformer structure without the center tap using a full bridge rectification.
Figure 4B:
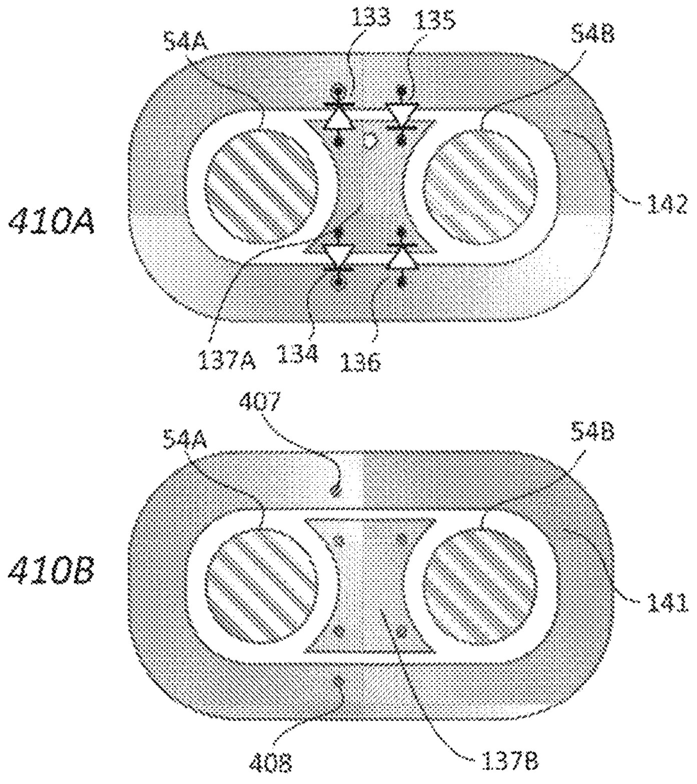
FIG. 4B shows the secondary winding implementation of the transformer presented in FIG. 4A.

In FIG. 4A is presented a transformer structure using full bridge rectification. It is composed by a primary winding 138, a secondary winding 137, four rectifier means 133,135, 134, and 135. The rectified voltage is connected to 141 and 142. The primary winding terminations 139 and 140 are connected to an AC source, which can be generated, by a full bridge, half bridge or any other topologies. In FIG. 4B is presented the secondary winding arrangement for one turn secondary. For one of the polarities the current is flowing through 136, the copper section, 137A and 137B placed in between the cutouts 54A and 54B, and further through 133, through the via 407 to the layer 410B towards 141. During the other polarities the current will flow from 142, through 135 and further through the copper section, 137A and 137B placed between the cutouts 54A and 54B, and further through rectifier means 134 and through via 408 to the layer 410B, towards 141. In this topology the secondary copper utilization, it is inherently very good because the secondary winding 137 does conduct during both polarities. The winding structure presented in FIG. 4B however does incorporate the rectifier means, 133,136,134 and 135 as part of the secondary winding eliminating the end effects and reducing the stray inductance.

Figure 5A:
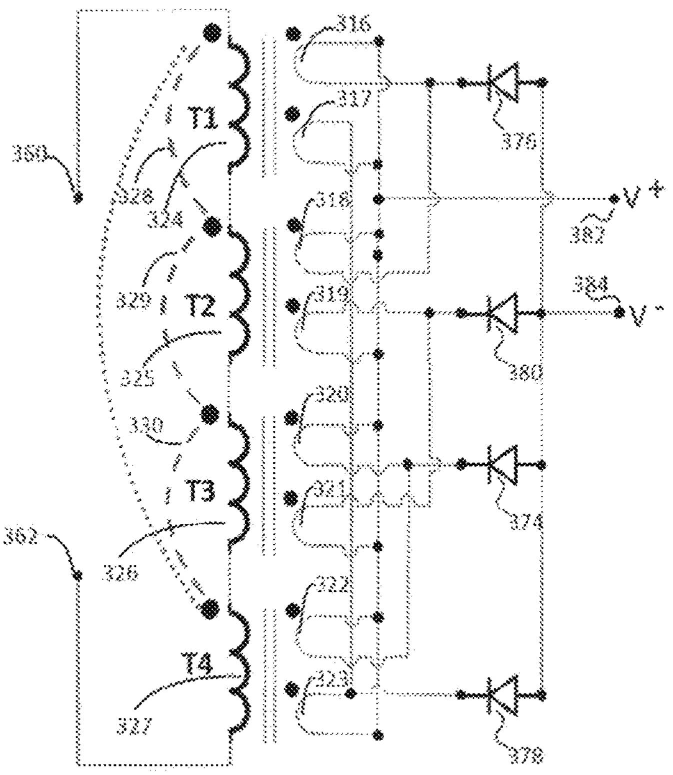
FIG. 5A shows the equivalent schematic of the four-legged magnetic structure with center tap.

In FIG. 5A is presented the equivalent circuit of one embodiment of this invention wherein a four legged magnetic core structure is used. There are four transformers T1, T2, T3 and T4, which are coupled to each other in series. The T1 is coupled with T2, T2 is coupled with T3 and T3 is coupled with T4 and further T4 is coupled with T1. In FIG. 5C is presented the definition of each transformer from T1 to T4. Each transformer is represented as an E core transformer having as a center post the entire cylindrical leg and two outer posts, which are half of the cylindrical legs in its direct vicinity. The shape of the four legs however can be rectangular or any other shape. Because the transformers T1, T2, T3 and T4 doe share sections of the same cylindrical posts, there is a coupling between them.

Figure 5B:
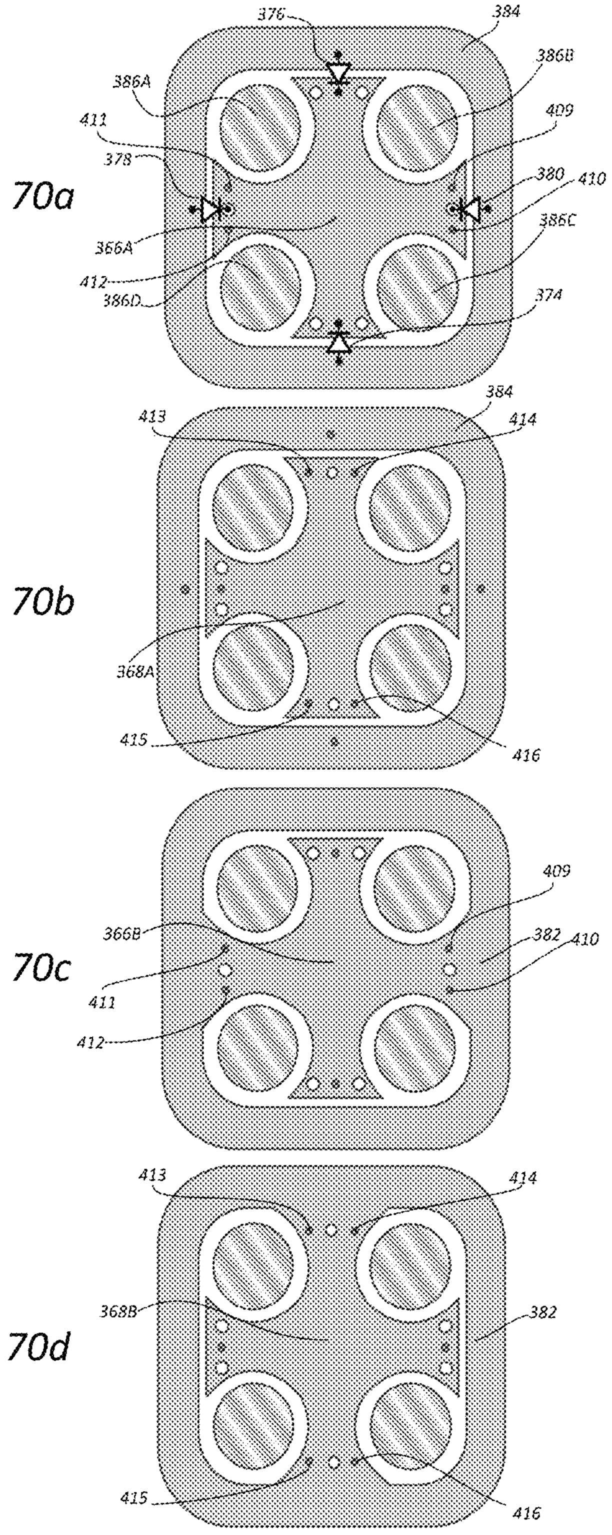
FIG. 5B shows the secondary winding implementation of the four-legged transformer presented in FIG. 5A.
Figure 5C:
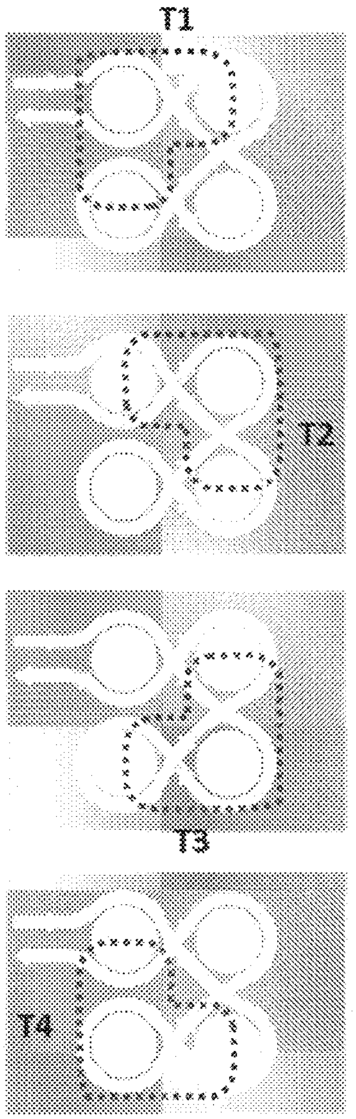
FIG. 5C shows the equivalent four transformers that are part of the four-legged transformer.

The equivalent schematic of the magnetic structure implemented in FIG. 5B is presented in FIG. 5A. An AC signal is applied between 360 and 362, which can be generated by a full bridge, a half bridge structure, or any other double-ended topology. When a signal with positive polarity at 360 versus 362 is applied the rectifier 376 and 374 are activated and the current flows from the negative voltage V−, 384, which in many applications is connected to the ground, further through the copper section shaped as a cross, 366A, located on the layer 70*a*, towards the via connection 411, 412 and 409, 410. Through the via 411, 412 and 409, 410 the current flows further on the layer 70C towards the 382. A parallel path for the current during this polarity is through the rectifier means 376 and 374, on the layer 70C further through 366B towards 382. During the other polarity the other rectifier means 380 and 378 are activated and the current will flow further on layer 70*b* through the copper section shaped as a cross 368A towards via 413, 414 and 415, 416 and further to the layer 70*d* towards 382. Another path for the current flowing through 378 and 380 is through 368B on layer 70*d* towards 382.

The current flowing through 384,382, which surrender the four-lagged magnetic structure, and through 366A, 368B, 366B and 368B is aimed to cancel the magnetic field produced by the primary winding. The fact that the primary winding is split in four sections surrounding the four lagged magnetic core legs 115A, 115B, 115C and 115D from FIG. 10, and on each leg we have current flow into the secondary to suppress the magnetic field created by the primary winding, the leakage inductance in the magnetic structure presented in this patent application, it is very low. The copper arrangement depicted in FIG. 5B does allow a very low impedance current flow and in addition to this the rectifier means 376,380,374 and 378 are part of the secondary winding eliminating in this way the end effects and the stray inductance. The end effect is characterized by the ac losses in the copper after the secondary winding leaves the transformer to make the connection to the secondary means. In this embodiment, there are no end effects because the secondary winding does not leave the magnetic structure, each rectifier means being part of the secondary winding.

Figure 10:
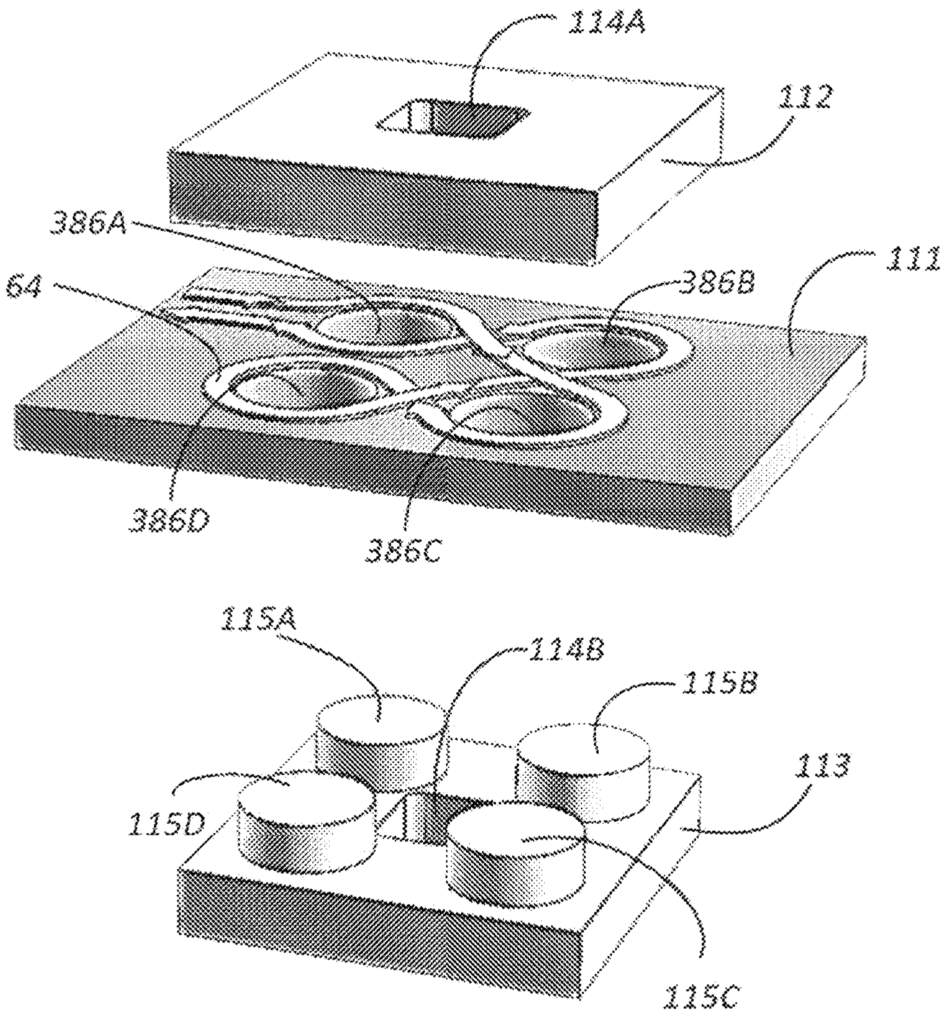
FIG. 10 shows three-dimensional drawing of the four-legged magnetic structure.

The magnetic structure depicted in FIG. 5B does have several advantages over the conventional magnetic using an E core and even U shape cores. First of all the leakage inductance is significantly reduced. In addition to this, the ac losses in the windings are further reduced because the magnetic field intensity between primary and secondary is four times reduced by comparison to one magnetic core structure. In addition to this, the core volume of this configuration is it smaller than smaller than one core configuration. The placement of the rectifier means as a part of the secondary ending eliminated the end effects and the stray inductance between the secondary winding and the rectifier means. The coupling between the four equivalent transformers as depicted in FIG. 5A reduces the thickness of the ferrite plates 112 and 113, which are placed on top of the four cylindrical legs 115A, 115B, 115C and 115D as depicted in FIG. 10.

Figure 6A:
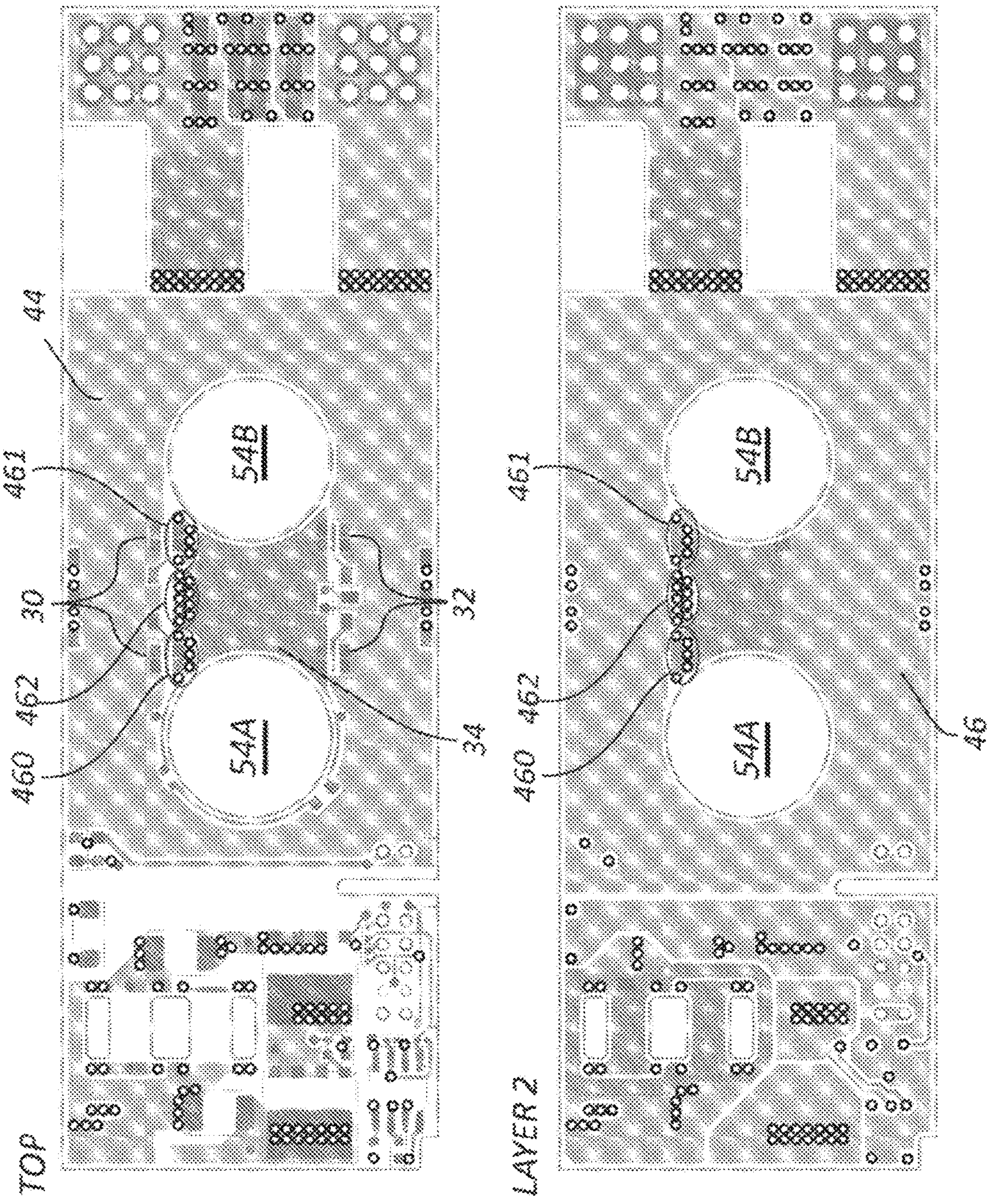
FIGS. 6A through 6D show metal etch layers comprising winding in the transformer using the U core implementation described in FIGS. 3A and 3B.
Figure 6B:
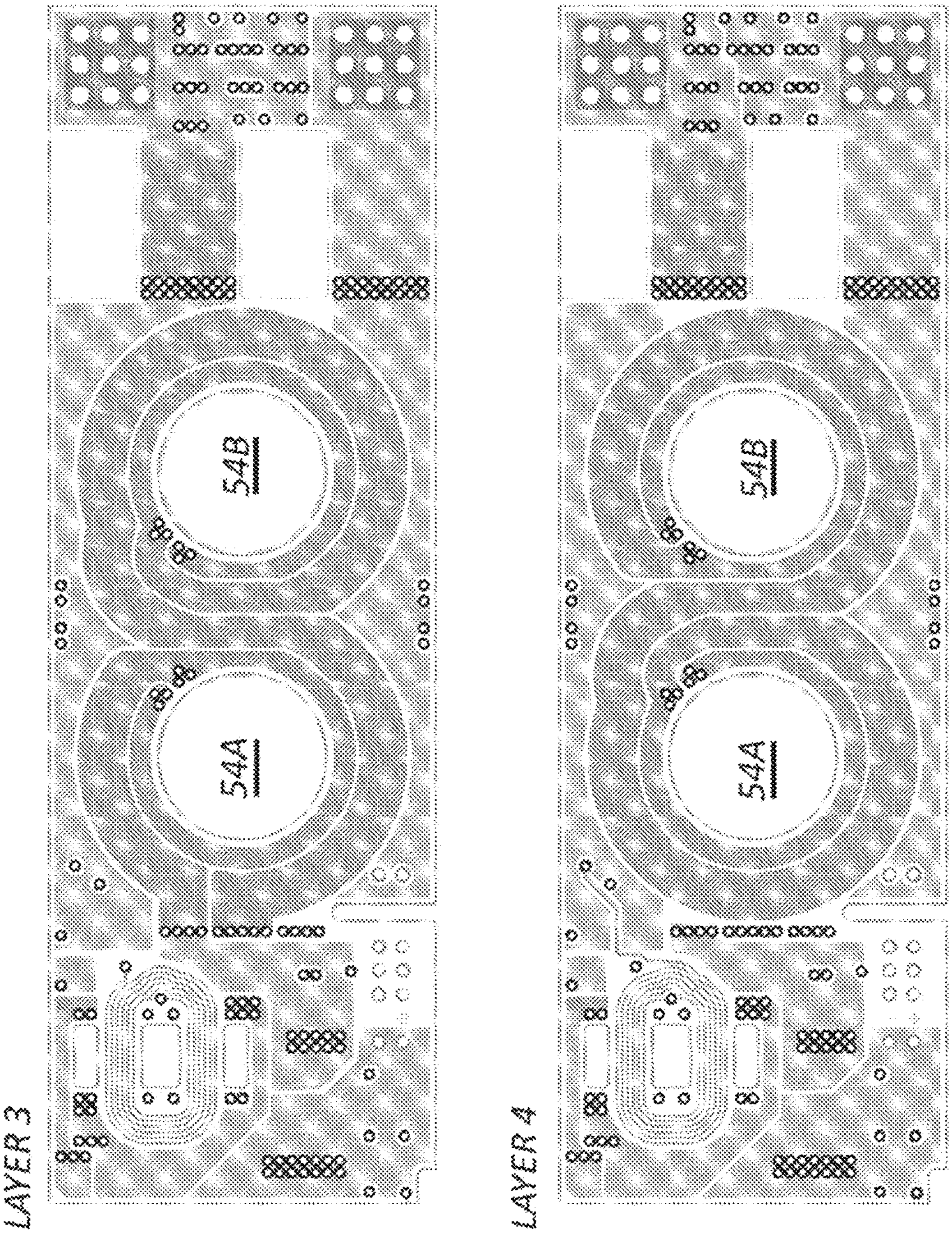
Figure 6C:
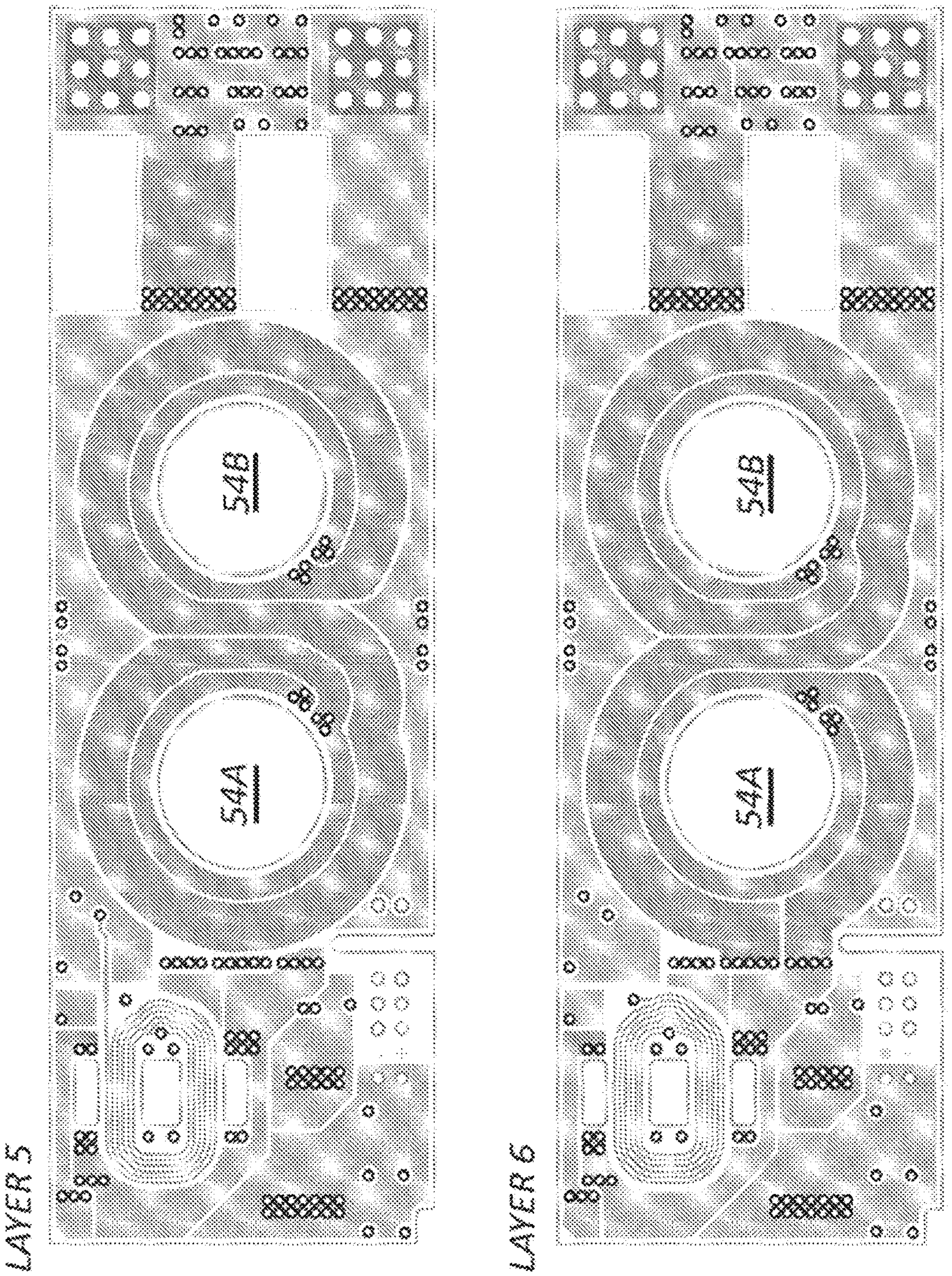
Figure 6D:
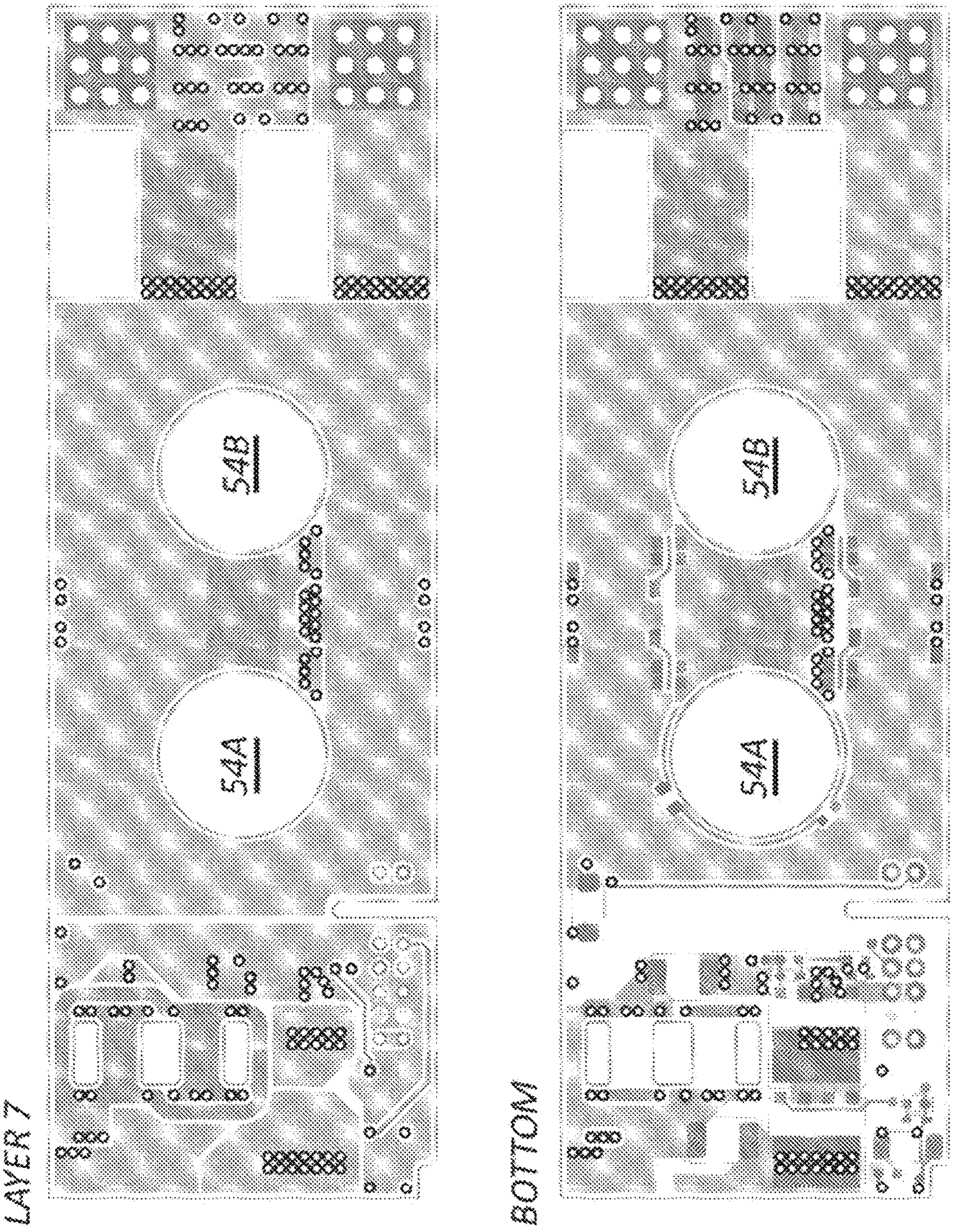

In FIG. 6A through 6D are presented metal etch layers comprising windings for the transformer structure presented in FIG. 3A. The winding implementation of FIG. 6A through 6D is optimized in respect of layers utilization for the purpose of industrialization. In FIG. 3B we are using four layers while in FIG. 6A we are using just two layers. In FIG. 6A is presented the top layer and layer 2. On the top layer the cutouts for the magnetic core, 54A and 54B are surrender by a copper connected to ground which is FIG. 3A is labeled 44. On the layer 2, the cutouts for the magnetic core, 54A and 54B are surrender by copper connected to 46, as per FIG. 3A. The rectifier means 30 and 32 from FIG. 3A are implemented by using two synchronous rectifiers in parallel. The copper section, 34, placed between the cutouts 54A and 54B, is connected to the group of via 462. The drain of the rectifier means 30 is placed on two pads connected to the group of via 460 and 461. During the polarity wherein the rectifier means 32 are conducting the current is flowing from 44 through the rectifier means 32 further through 34 and through the via 462 to the layer 2 where the current flows to 46. During the polarity wherein the rectifier means 30 are conducting the current is flowing from 44 through the rectifier means 30 further through 460 and 461 to layer 2 and further through the copper placed between the cutouts, 54A and 54B, towards 46. On FIG. 6B, 6C are presented the primary windings, which are incorporated in layer 3, 4, 5 and 6. In FIG. 6D is presented the secondary winding together with the rectifier meas. These layers are identical to the layer 1, the top, and layer 2. However, on these layers, the winding configuration is placed in a mirror arrangement. The massive copper arrangement around the magnetic core legs allows the current to flow optimally and choose its own path in order to cancel the magnetic field produced by the primary winding. This helps in further reducing the leakage inductance in the transformer structure.

Figure 7A:
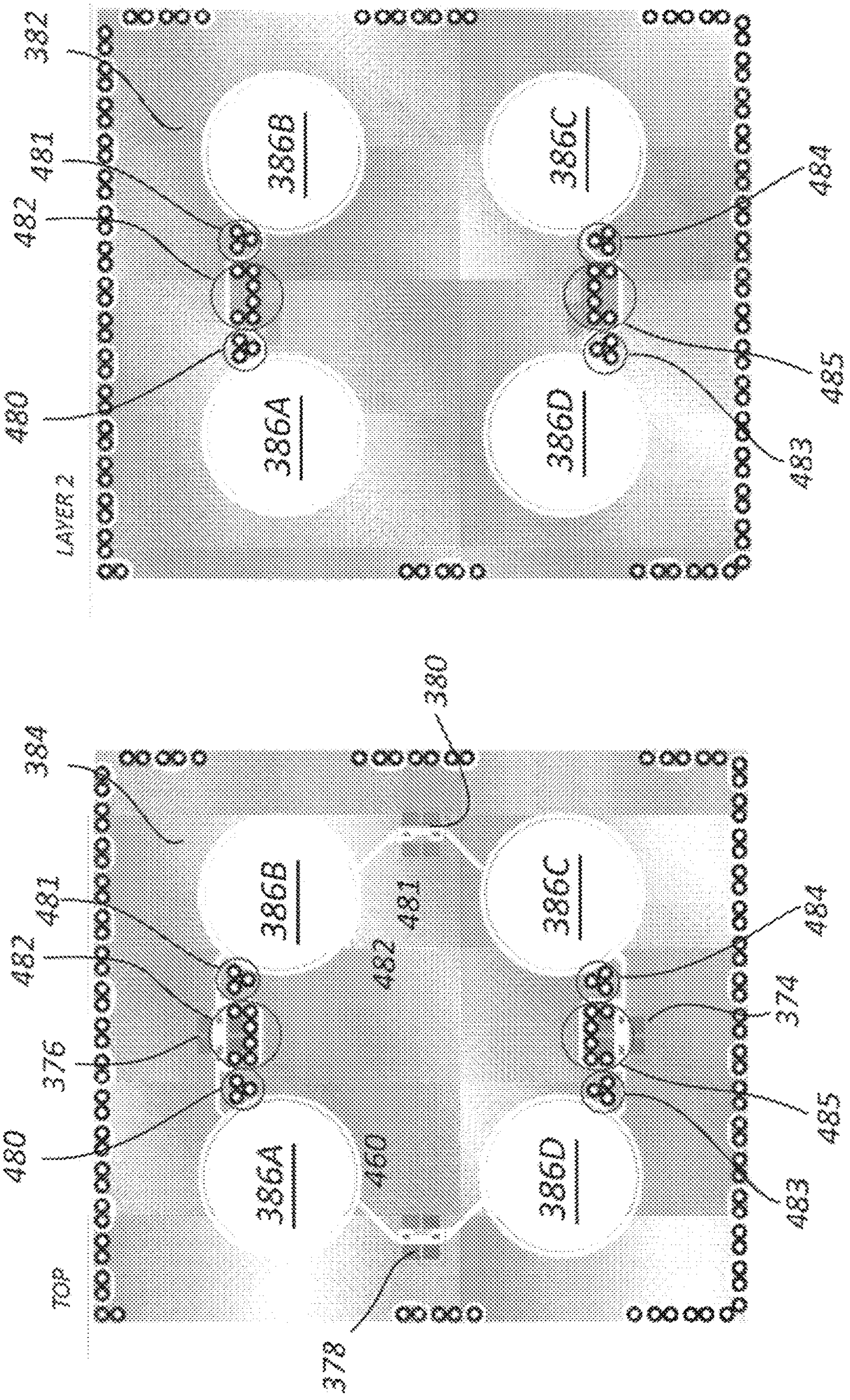
FIGS. 7A and 7B show metal etch comprising winding for the four-legged magnetic structure described in FIGS. 5A and 5B.

In FIG. 7 is presented an optimized implementation of the magnetic structure of FIG. 5B. In FIG. 7A the four legged magnetic structure is using just two layers for the secondary winding unlike four layers as depicted in FIG. 5B. This implementation is for industrialization wherein the cost effectiveness is very important.

For one of the polarities of the voltage applied to the primary transformer between 360 and 362, FIG. 5A, the rectifier means 376 and 374 conducts and the current will flow from 384 through 376,374 through the via 482 and 485 to the second layer. On the second layer, the current will continue to flow in both directions, one between the cutouts 386A and 386D and between cutouts 386B and 386C towards V+, 382. During the opposite polarity the current will flow from 384 through rectifier means 380 and 378 towards the via 480,481 and respectively 483 and 484, to the layer 2 and further to V+, 382.

Figure 7B:
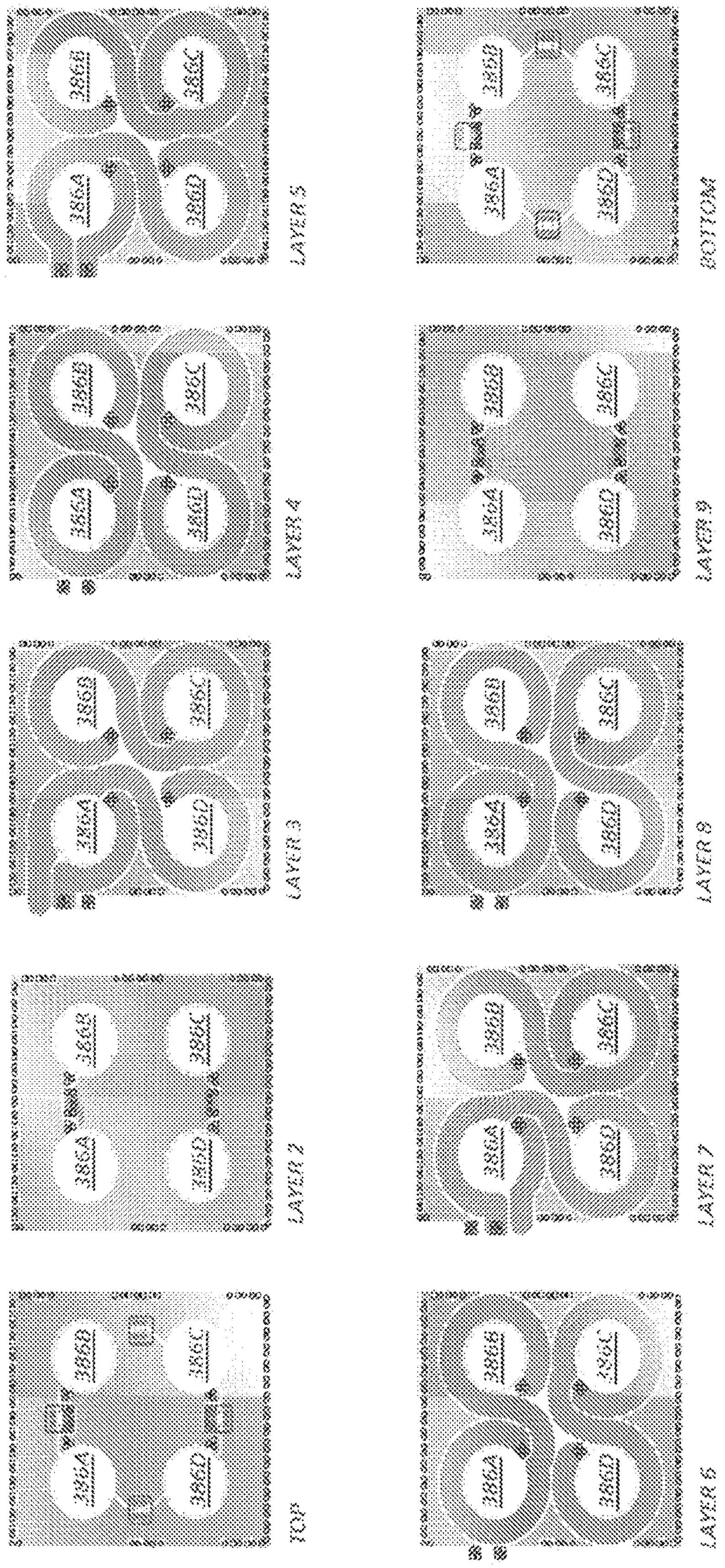

The implementation of the secondary winding depicted in FIG. 7A has the advantage of using just two layers. In FIG. 7B is presented all the layers, starting with to top two layers incorporated secondary winding and the bottom two layers, layer 9 and layer 10 wherein secondary windings are also implemented. The layer 1 and layer 2 and layers 9 and 10 are mirror imagine to each other. The primary windings are implemented on layers 3,4,5,6,7 and 8.

Figure 8A:
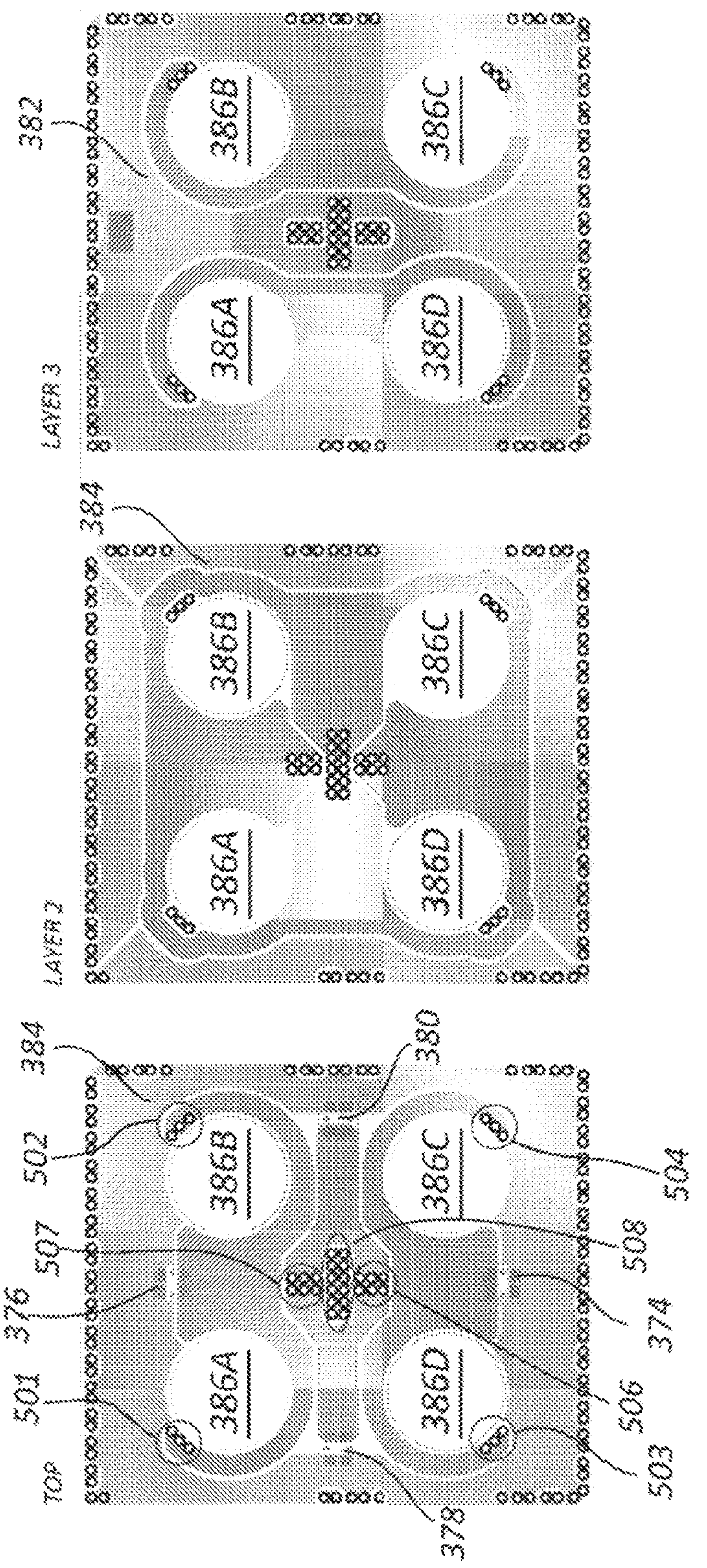
FIGS. 8A and 8B show metal etch comprising winding for the four-legged magnetic structure having two turns secondary winding.

In FIG. 8A is presented one of the embodiments of the four-legged magnetic structure wherein we have two turns in the secondary winding. During one of the voltage polarity injected between 360 and 362 the rectifier means 376 and 374 conduct and the current will flow from 384 through 376, 374 and further around the magnetic core cutout 386A, 386B and respectively 386C and 386D towards via 501,502 and respectively 503,504 further on the layer 3 where will flow towards V+, 382.

During the voltage polarity applied between 360 and 362 when the rectifier means 380 and 378 are conducting the current will flow from 384, through 380 and 378 and further through via 506 and 507 on layer 2 and further through via 508 on layer 3 towards 382.

Figure 8B:
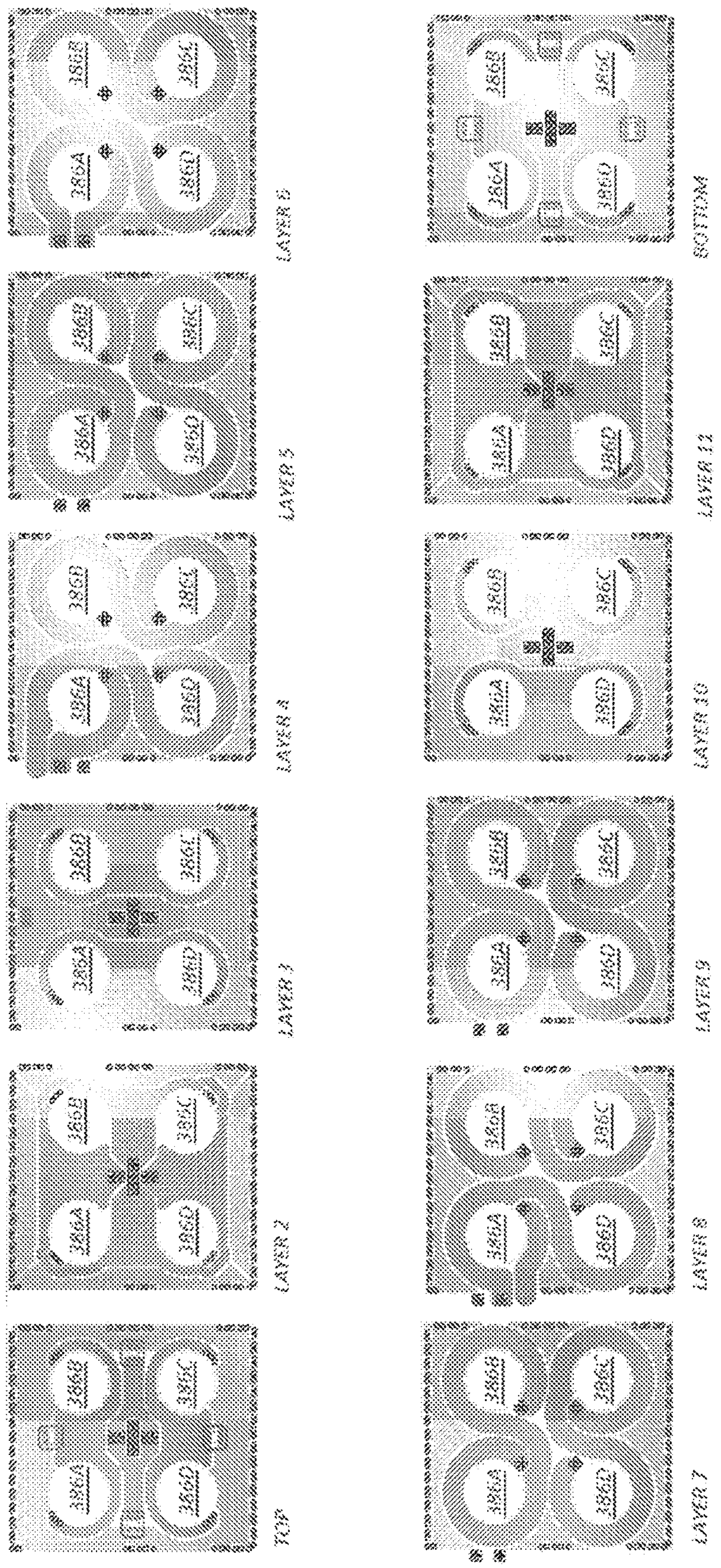

In FIG. 8B presented is the 12-layer-winding structure, in which the primary windings are implemented in six of the inner layers and the secondary windings are implemented in the top and bottom three layers.

Figure 9A:
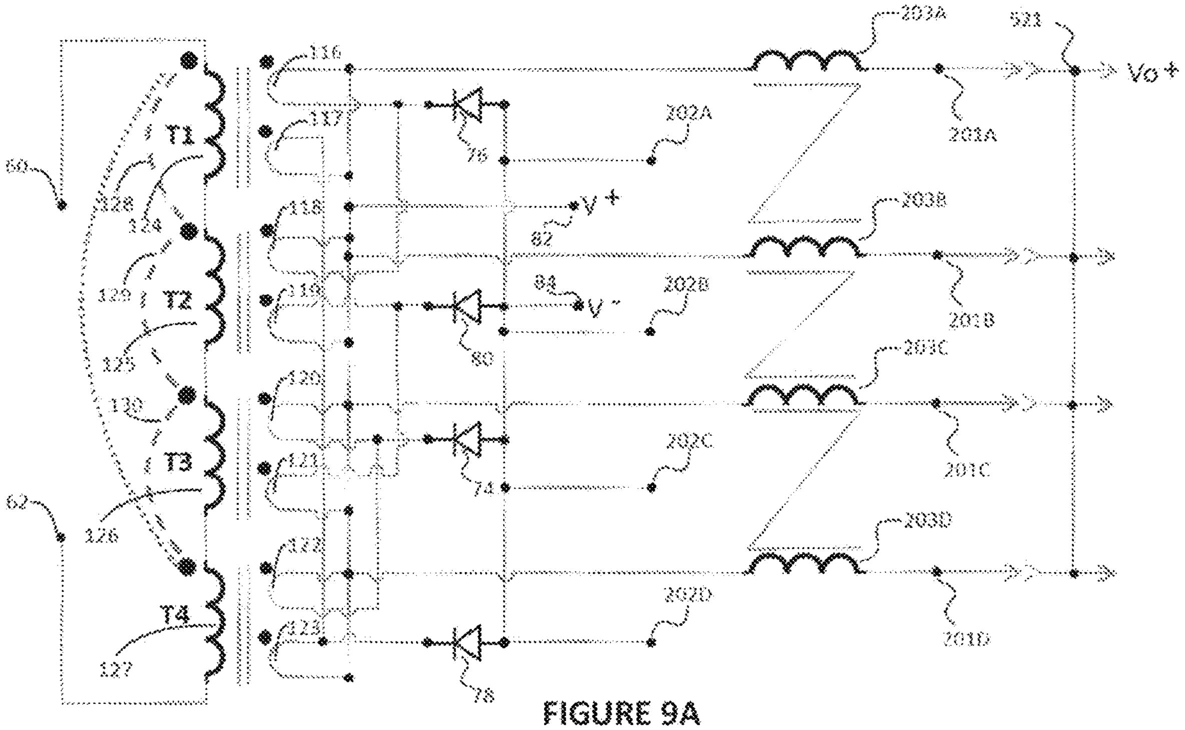
FIG. 9A shows an equivalent schematic of an implementation embodiment for the output inductor.
Figure 9B:
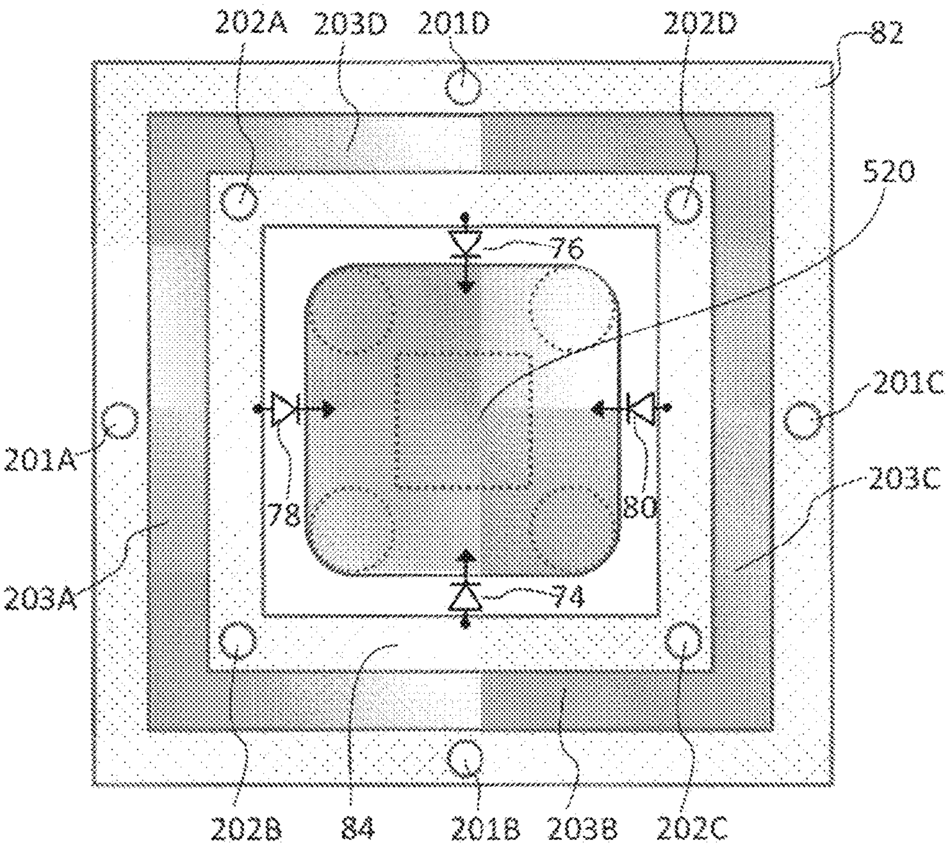
FIG. 9B shows an implementation of the four-legged magnetics structure from FIG. 9A together with an output inductor.

In FIG. 9A and FIG. 9B is presented another embodiment of this invention wherein there is a unique implementation of the output inductor. The entire four-legged magnetic structure, 520 which can be implemented in one of the configuration described in FIG. 5B, 7A, 7B or 8A, 8B or any other structure. The rectifier means 76, 74, 80 and 78 are rectifying the AC voltage injected in the primary winding. There are four pins, 202A, 202B, 202C and 202D, which are connected to the V−, 84. There are also four pins 201A, 201B, 201C and 201D whish are connected to V+, 82 as presented in FIG. 9A. There is a magnetic core composed by four sections 203A, 203B, 203C and 203D, which connected together. The entire structure can be formed by one magnetic core or four independent sections placed together. The current flowing towards 201A, 201B, 201C and 201D will flow under the magnetic core. The pins, 201A, 201B, 201C and 201D are connected further to the motherboard where they will form Vo+, 521. The pins connected to the V−84, 202A, 202B, 202C and 202D are also connected to the motherboard. The implementation of the output choke using a continuous peace of ferrite material, which does not perforate the multiplayer PCB, 82 it, is unique. In this embodiment we split the output current and by connecting the V−, 84 pins, 202A, 202B,202C and 202C and V+,201A, 201B,201C and 201C pins to the mother board we create turns around the magnetic core formed by 203A,203B,203C and 203D. This embodiment is very suitable for very high current application where we reduce the current applied to each pins by a factor of four in this particular implementation. In the case, if we use more than four legs transformer, for example N legged transformer then we can split the current in N section and use N pins to connect to the motherboard the V+ and N pins to connect to V−. The arrow placed in the cathode of the rectifier means 76, 80, 74 and 78, in FIG. 9B symbolizes the connection to the winding structure of the four legged transformer as presented in FIGS. 5B, 7A and 7B and 8A and 8B.

Figure 11:
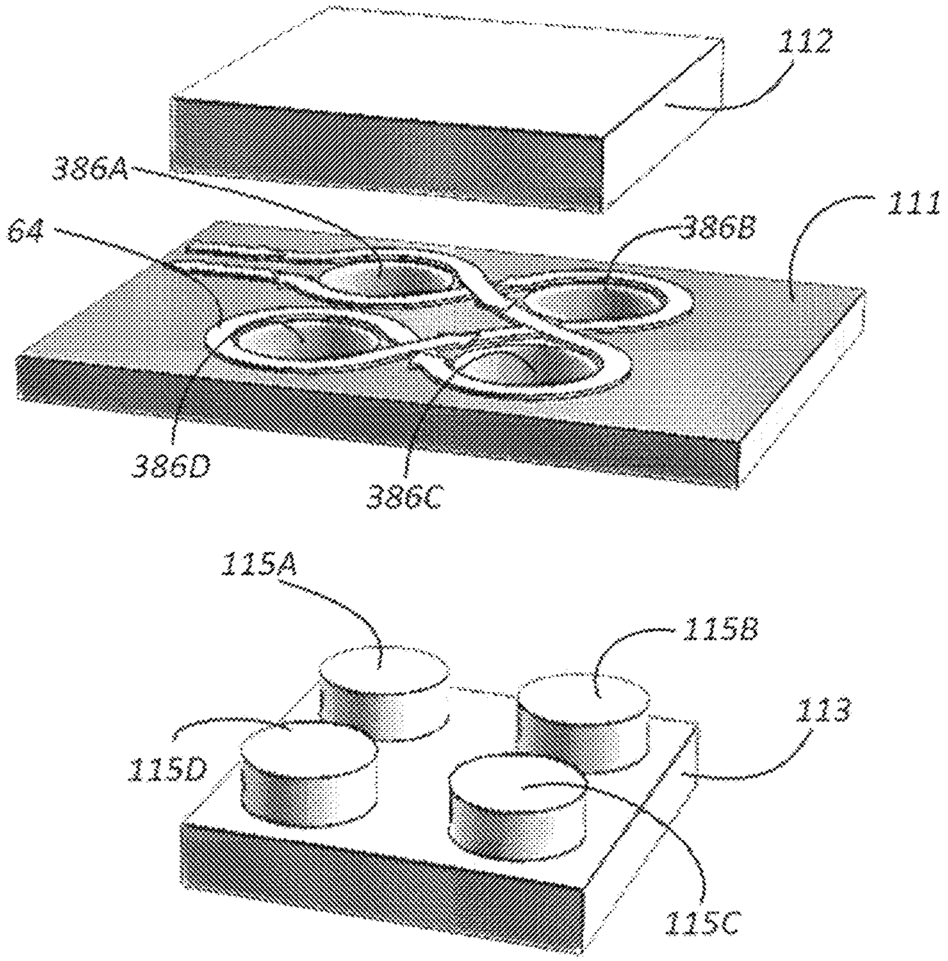
FIG. 11 shows three-dimensional drawing of the four-legged magnetic structure wherein the cutout in the upper and lower plate is removed.

In FIG. 10 presented is the four-legged magnetic configuration. The primary and secondary windings of the transformer are implemented on the multilayer PCB, 111. There is a four legged magnetic core formed by a magnetic plate 113 and four cylindrical posts, 115A, 115B, 115C and 115D. There is a cutout 114B in the plate 113. The four cylindrical posts penetrate through the holes 386A, 386B, 386C and 386D. A plate 112 with a cutout 114A is placed on top making contact with the cylindrical posts directly or using an interface gap. In FIG. 11 is presented the same structure with the difference that the cutout 114A and 114 B is eliminated. There is not a magnetic flux through that cutout but for simplicity of the implementation in case of industrialization, the cutouts can be eliminated.

Figure 12:
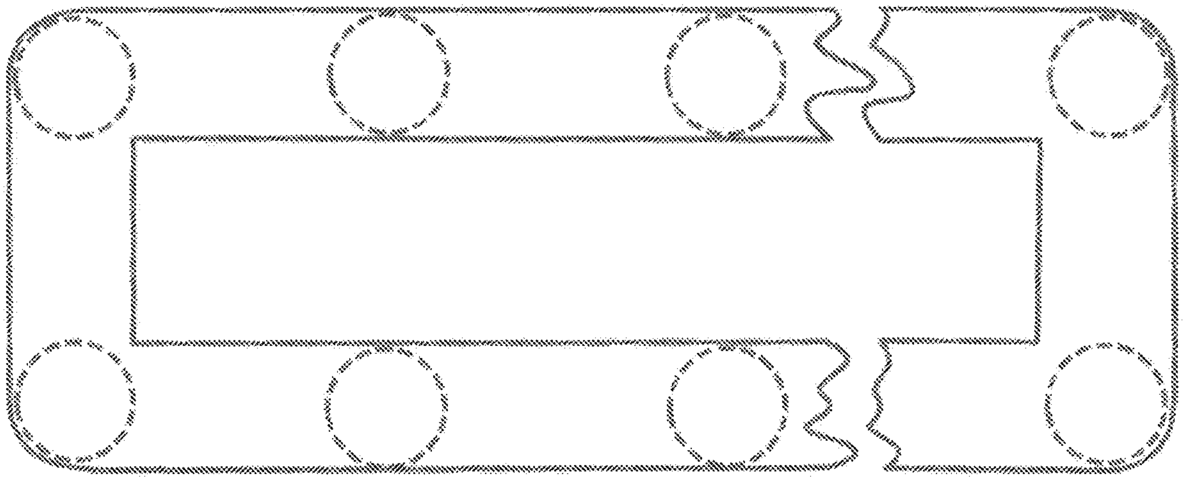
FIG. 12 shows an implementation of the multi legged magnetic structure.
Figure 13:
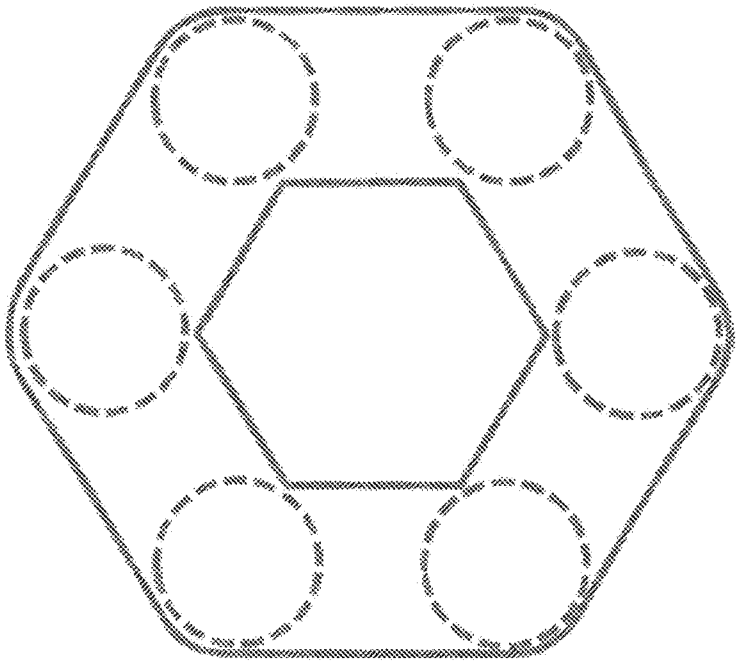
FIG. 13 shows another implementation of the multi legged magnetic structure.

In FIG. 12 is presented another arrangement of this multi-legged magnetic structure in a rectangular shape having a multitude of legs. There can be many shapes we can implement this structure, one of them is presented in FIG. 13. Each magnetic structure starting with the two legged transformer, four-legged transformer and generally N legged transformer can be multiplied and each section can share the same primary winding. They will form power-processing cells and if they share the same primary winding, the leakage inductance between the primary winding and the secondary winding can be further reduced. The multi-legged magnetic structures can be used as transformers or can be used as inductors. In the inductor implementation the gap can be placed on top of each cylindrical leg and create a very efficient distributed gap minimizing in this way the gap effect.

Figure 14:
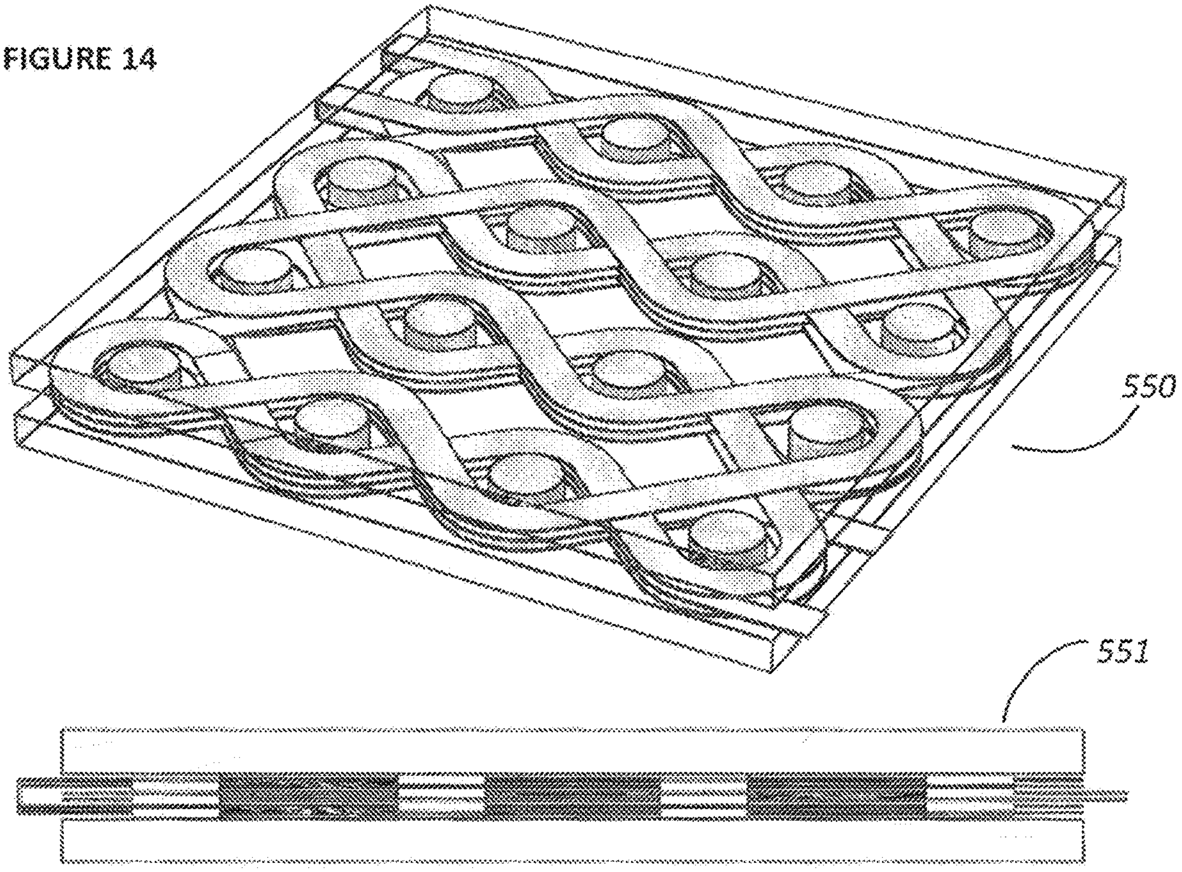
FIG. 14 shows an implementation of the multi-legged magnetic structure employing ferrite material for the posts and the horizontal plates.

In FIG. 14 is presented a general multi-legged magnetic structure. The windings are implemented in a multiplayer structure which can be embedded also in a multilayer PCB and there are cylindrical magnetic posts and two magnetic plates, one on top and one on the bottom, as depicted in 550 and 551.

Figure 15:
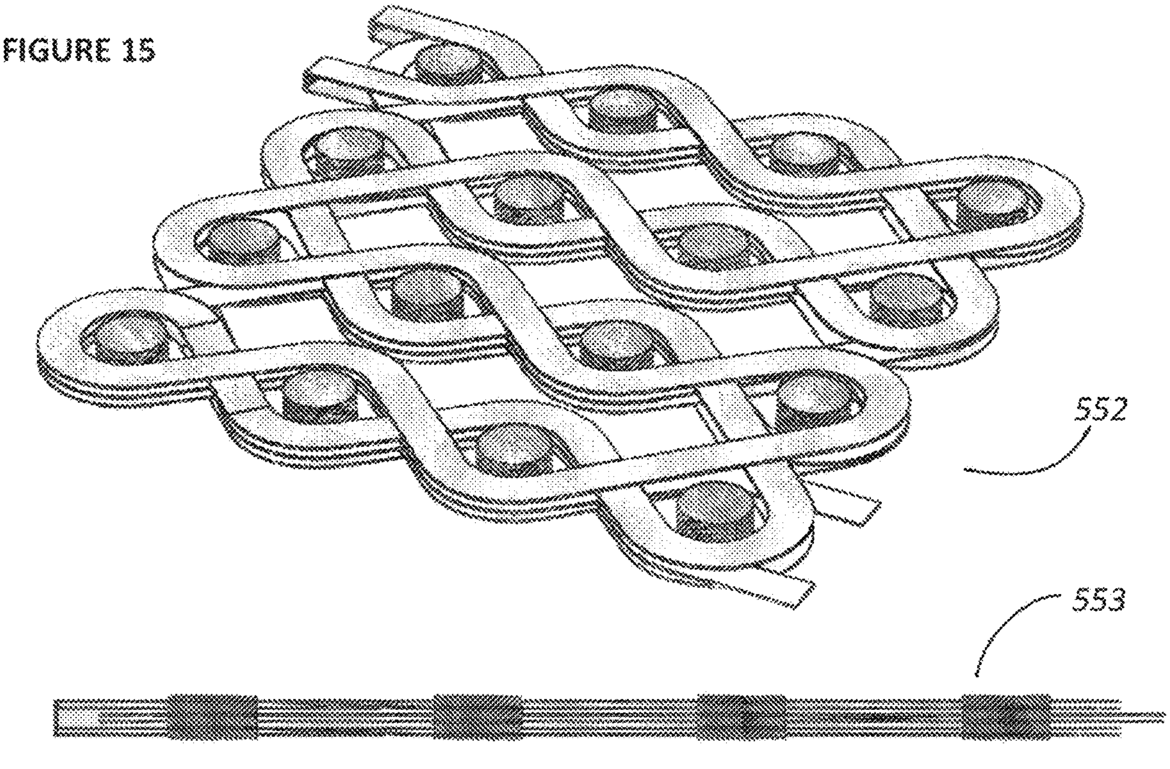
FIG. 15 shows an implementation of the multi-legged magnetic structure employing ferrite material for the posts and without horizontal plates.

In FIG. 15 is presented an implementation wherein the windings are placed in multilayer structure, which can be a multilayer PCB and the magnetic cylindrical post without the ferrite plates on top and bottom, as depicted in 552 and 553.

Figure 16:
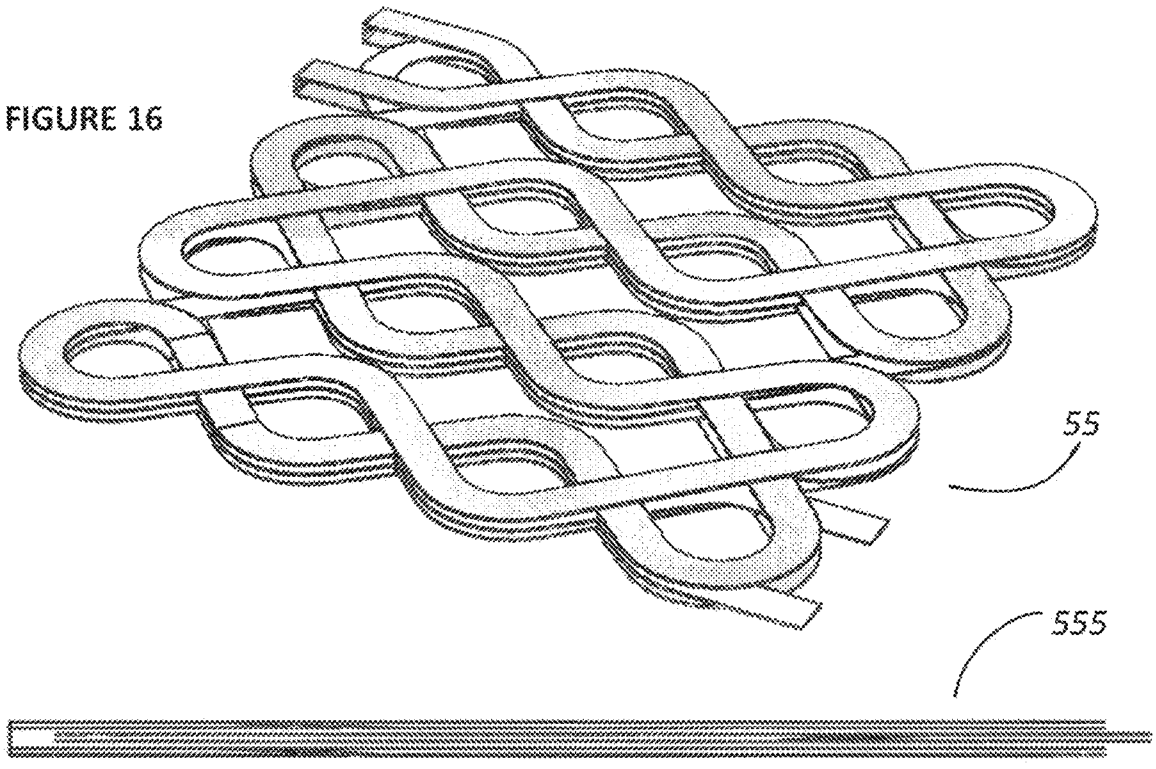
FIG. 16 shows an implementation of the multi-legged magnetic structure without any magnetic material.

In FIG. 16 is presented an air core structure wherein the magnetic core material is totally removed and the windings are implemented in a multiplayer structure, which can be multilayer PCB. Such an air core structure has many advantages one of them being much lower AC losses in the winding at high frequency.

Figure 17:
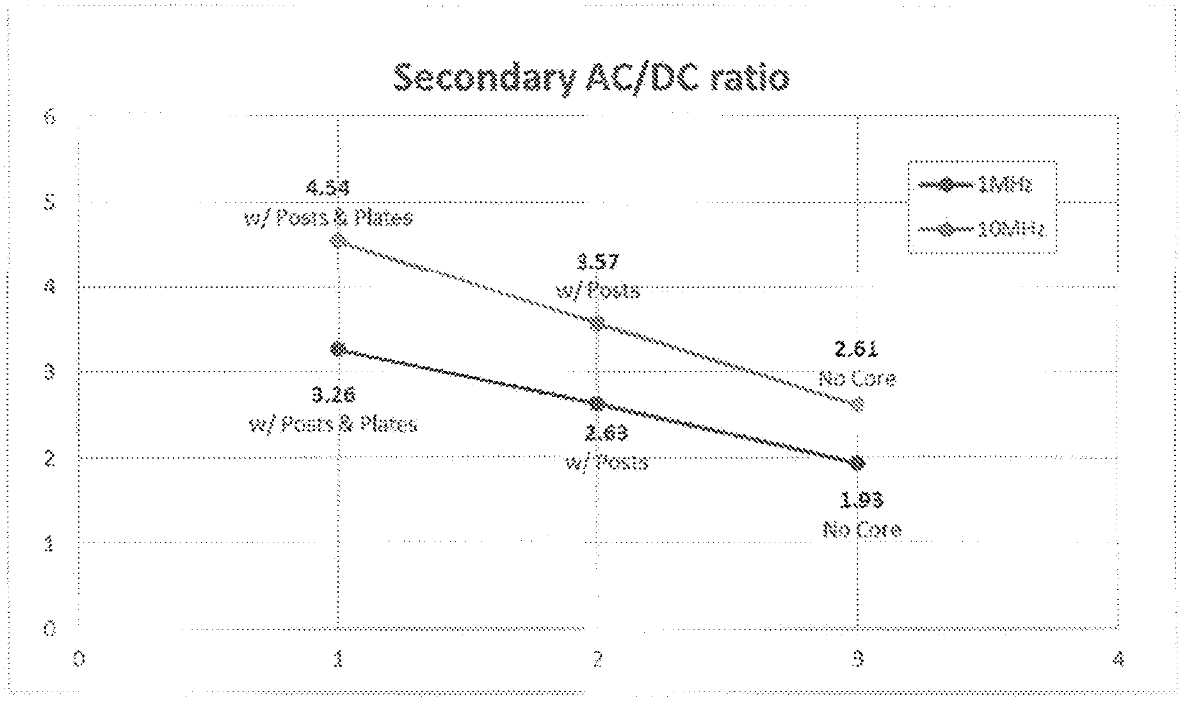
FIG. 17 shows ratio AC/DC in the secondary winding for the magnetic structures presented in FIG. 14, FIG. 15 and FIG. 16.

In FIG. 17 is presented the simulate losses in such structures at 1 Mhz and 10 Mhz using posts and plates of magnetic material, just the magnetic posts of magnetic material and without any magnetic material.

The major advantage of these magnetic structures, especially for the air core implementation is the fact that the magnetic flux does weave from a loop to another reducing significantly the radiation. This magnetic structure with air core described in 554 contains the magnetic field, and forces it to be parallel with the winding, and it is very suitable for magnetic configuration without magnetic core. In addition to this has a low ac loss for very high frequency application wherein this structure may be used. This magnetic structure will allow power conversion at very high frequency in the range of tens of MHz with high efficiency.

Embodiments of FIGS. 18-32C

Figure 18:
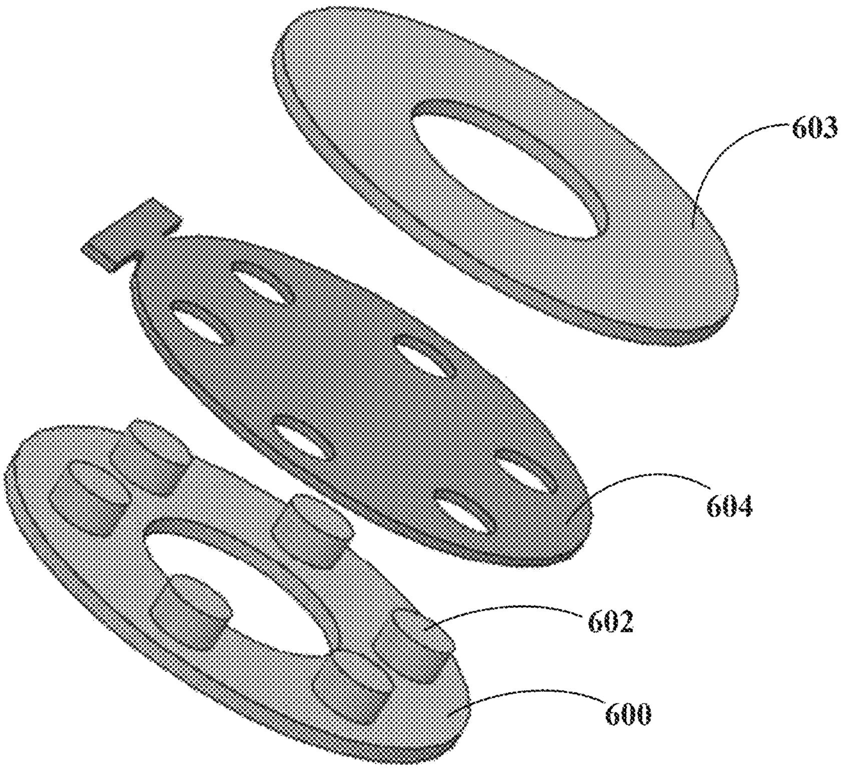
FIG. 18 is a perspective view of elements of a magnetic structure of a multilayer PCB in which six cylindrical posts are used.
Figure 19:
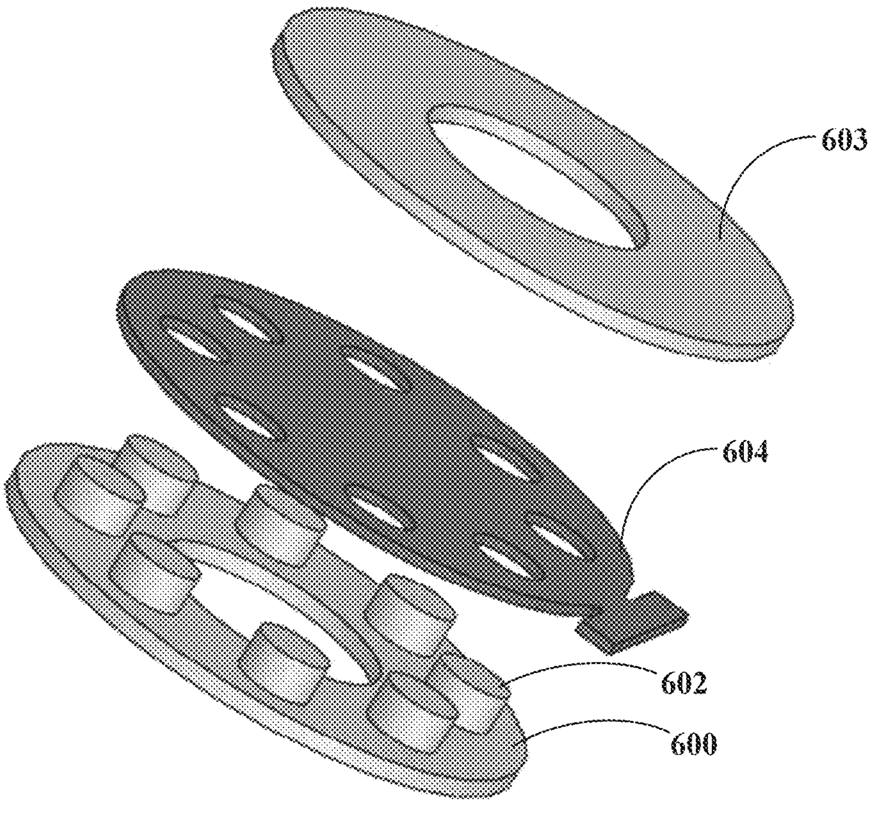
FIG. 19 is a perspective view of elements of a magnetic structure of a multilayer PCB in which eight cylindrical posts are used.
Figure 20A:
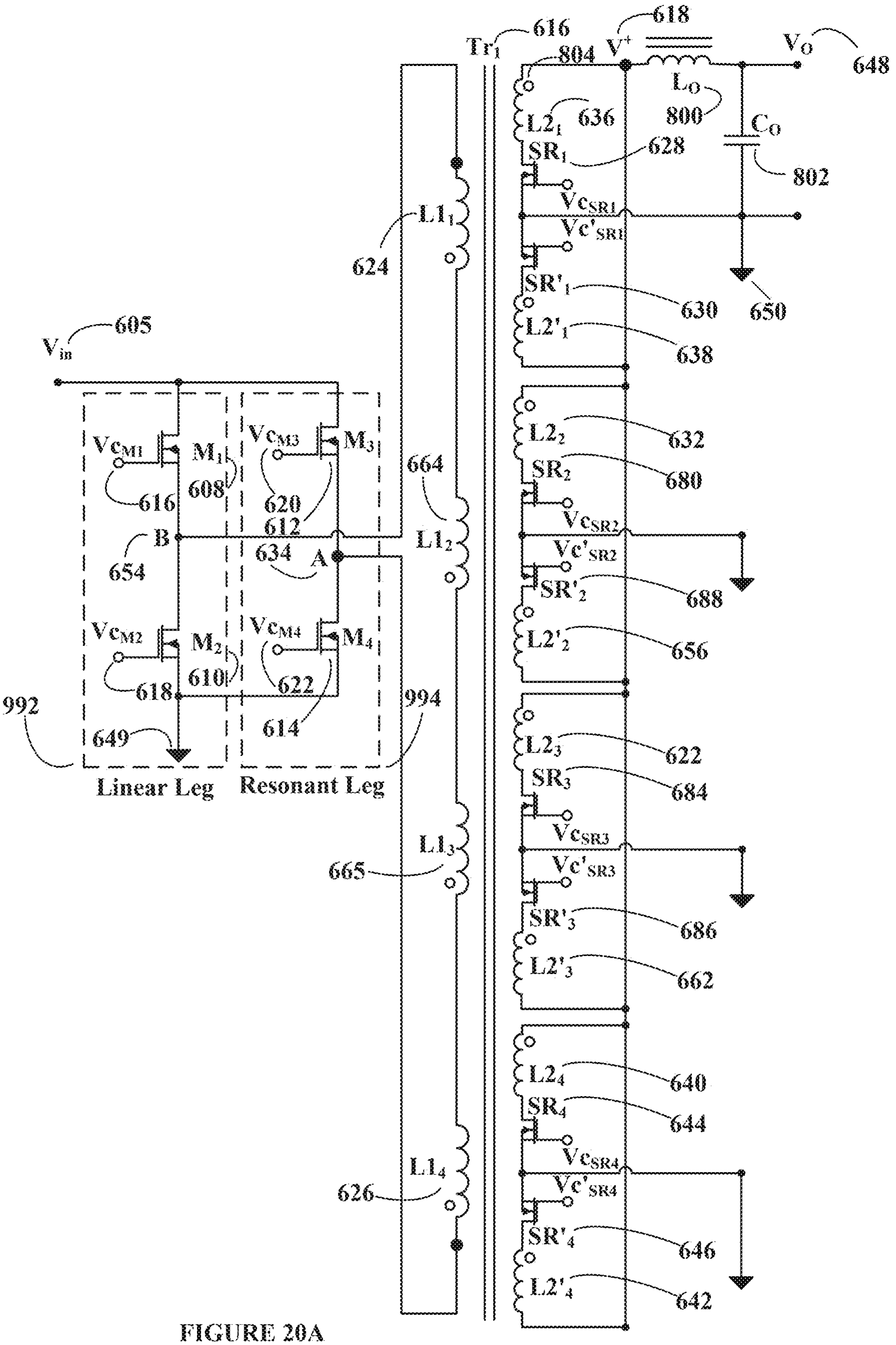
FIG. 20A is an electrical schematic of a power train employing the magnetic structure.
Figure 20B:
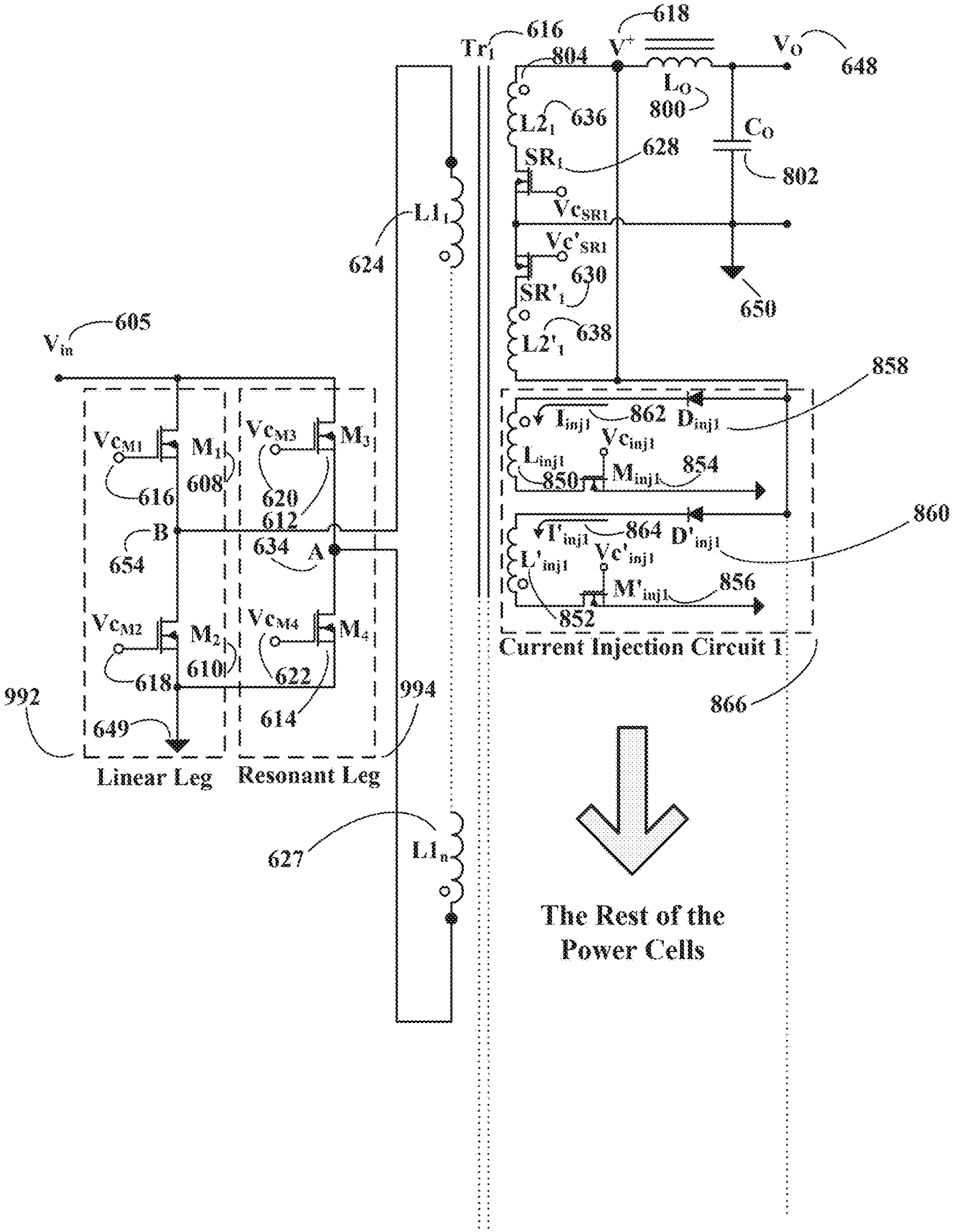
FIG. 20B is an electrical schematic of a power train employing the magnetic structure and Rompower current injection.

In FIG. 18 is presented a novel magnetic structure having three elements: a magnetic circular plate, 600 with six cylindrical posts, 602, a multilayer PCB, 604, wherein the windings are embedded, multilayer PCB having six round cutouts to accommodate the cylindrical posts, and an additional plate 603. Briefly, the term "novel" is used herein to identify the magnetic structure through the specification, and is not intended to identify novelty, or to limit or otherwise define the scope of this specification in any way. In FIG. 19 is presented a similar magnetic structure as in FIG. 18, with eight cylindrical posts. In FIG. 20A is presented the schematic of a power train having four power processing cells which are part of the transformer, 616. Each cell has a primary winding and secondary windings. In the first cell primary winding is L11, 624, and two power secondary windings, L21, 636 and L21', 638 and further, the fourth cell has a primary winding L14, 626 and two power secondary windings L24, 640 and L24', 642. In FIG. 20B Each power cell besides the primary winding and two power secondary winding contains additional auxiliary windings such as Linj1, 850 and Linj1', 852 which are part of the assembly 866, named "Current Injection Circuit 1" as depicted in FIG. 20B. The current injection circuit which is part of each power cells is described in detailed in "U.S. Pat. No. 10,574,148, which is incorporated herein by reference.". In the magnetic configuration described herein, leakage inductance between primary windings and secondary windings is very small. In full bridge phase shifted topology, zero voltage switching is obtained from the energy in the leakage inductance. In application wherein the leakage inductance is very small zero voltage switching cannot be obtained. To address this matter, current injection technology was developed and that it is presented in the patent application U.S. patent application Ser. No. 16/751,747, which is incorporated herein by reference. In an application wherein the magnetic structure presented herein is used, for the proper functionality of the current injection, the current injection windings such as Linj1, 850 and Linj1', 852 has to be well coupled with the primary and secondary winding per each cell. In conclusion, the current injection circuit such as current injection circuit 1, 866 is preferably part of each power cell.

Each cell contains two rectification means, which in cell 1, is SR1, 628 and SR1',630. The rectifier means can be diodes or synchronized rectifiers. Each rectifier means has two terminations, a cathode and an anode, wherein the current through the rectifier means circulates unidirectionally from the anode to the cathode. In the case wherein the rectification means is a synchronous rectifier the anode is the source of the Mosfet, or GaN used as synchronous rectifier and the cathode is the drain of the Mosfet or GaN. In FIG. 20A and FIG. 20B the rectification means are depicted as Mosfets. In FIG. 3A is presented a power cell containing a primary winding 36, and two rectifier means, 30 and 32 in secondary and two secondary wining 34 and 36. The rectifier means have a common connection 44, and the secondary windings do connect together at the end which is not connected to the rectifier means. In FIG. 20A and FIG. 20B this common connection of the secondary windings is labeled V+, 618. The secondary windings configuration depicted in FIG. 3A is referred in the power conversion field as center tap. In FIG. 20A and FIG. 20B all the common connection of the secondary windings are connected together at V+, 618 and further connected to the output inductor, Lo, 800. The output inductor Lo, 800 is further connected to the output capacitor Co, 802. The output capacitor has one terminal connected to GND, 650 and the other termination is connected to Vo, 648 wherein the output load is connected.

In FIG. 20A, the number of cells is four, but this concept can be implemented with any number of cells. In a full bridge topology, or in full bridge phase shifted topology which is presented in FIG. 20B, the voltage in the windings has two polarities function of the which pair of primary Mosfets in the primary are turned on. For example, if M3, 612, and M2, 610, are turned on, the voltage across the winding L21, 636 is positive at the dot, 804 and SR1, 628, is conducting and the same applies to SR2, 680, SR3, 684, and SR4, 644. The simultaneous conduction of M3,612, and M2, 610 is referred to herein as phase A. The simultaneously conduction of M1, 608, and M4, 614, wherein SR1', 630, is conducting and the same applies to SR2', 688, SR3', 686, and SR'4, 646. The simultaneous conduction of M1, 608 and M4, 614 is referred to herein as phase B. In full bridge phase shifted there is also a period of simultaneous conduction for M1, 608, and M3, 612 and also a period of simultaneous conduction between M2, 610, and M4, 614, periods referred in the power conversion field as "dead time" wherein the voltage across the transformer windings in primary and secondary is zero.

In FIG. 20B is depicted the same configuration as the one presented in Figure and for simplicity is presented only one power cell in the secondary and in addition to that the subcircuit, 866, referred herein as "Current Injection Circuit 1". The current injection circuit contains two additional windings, Linj1, 850 and Linj1', 852 well coupled with the windings in the power cell 1, L11, 624, L21, 636 and L21' 638. In addition, the subcircuit, "current injection circuit 1" contains two current injection switchers, Minj1, 854 and Minj1', 856 and two current injection diodes, Dinj1, 858 and Dinj1', 860. The current injection circuit gets its energy from V+, 618, acting in this way also as a snubber for secondary windings, L21, 636 and L21', 638.

Figure 21A:
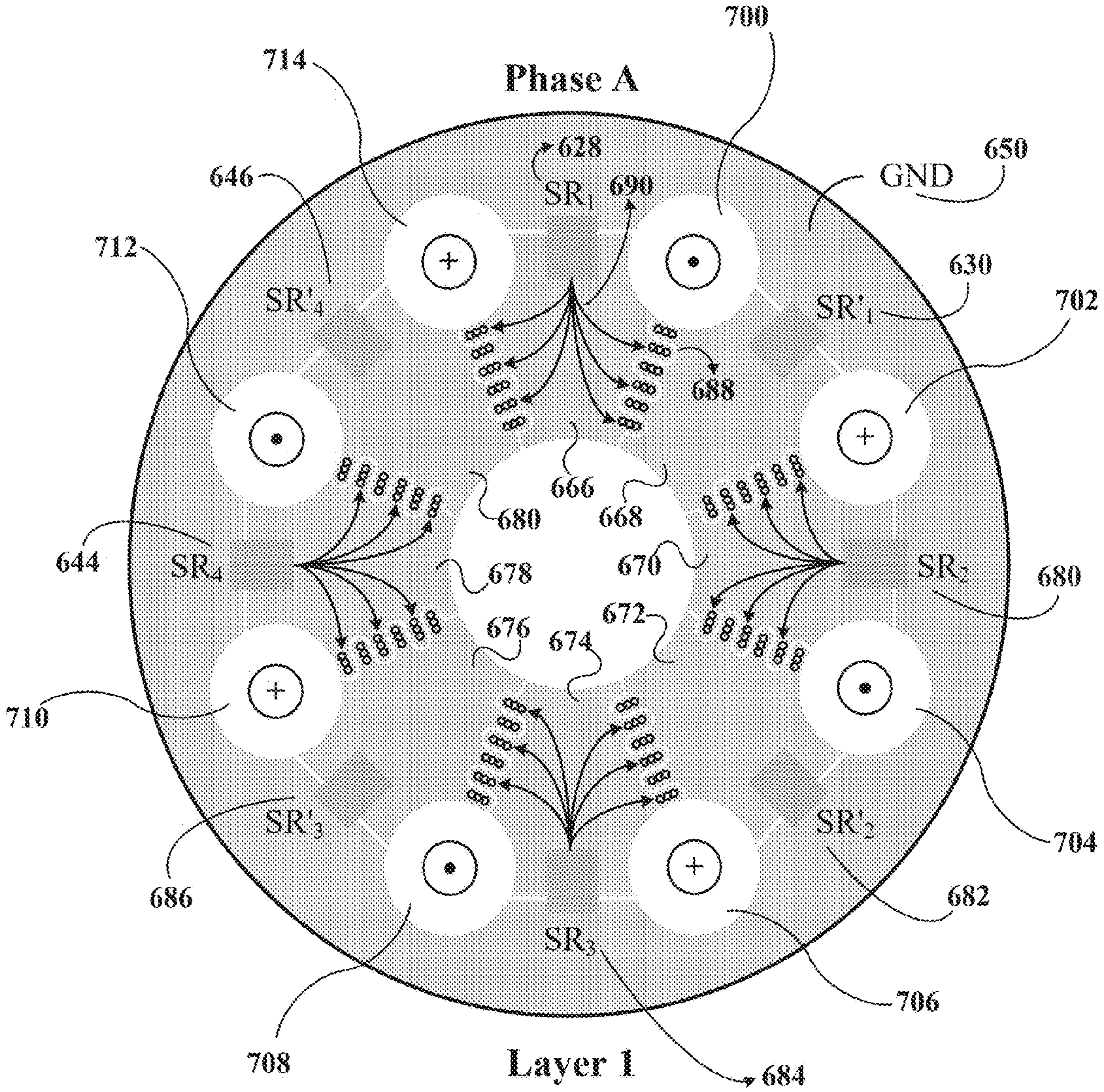
FIG. 21A represents the layout on the top layer of the multilayer PCB depicted in FIG. 19 and the current flow during phase A.

In FIG. 21A is presented in details the top layer, layer 1, of the multilayer PCB 604, from FIG. 19. The top layer of the multilayer PCB contains the rectifier means for all four power cells depicted in FIG. 20. The cutouts to accommodate the magnetic cylindrical posts depicted in FIG. 19 to penetrate the PCB are uniformly distributed on the multilayer PCB, 604. In FIG. 21A is presented the top view of the multilayer PCB with the magnetic posts penetrating through it. The polarity of the magnetic field through the cylindrical posts during the Phase A, is also depicted using the conventional symbolism: when the magnetic field exits from the posts it is shown as a circle with a dot in the center; and when the magnetic field gets into the posts from the top it is shown as a cross within a circle. Clockwise the posts penetrating through the multilayer PCB, are 700, 702, 704, 706, 708, 710, 712 and 714. The top layer, Layer 1, depicted in FIG. 21A, has an outer ring, 650 which is connected to the GND in the schematic presented in Figure FIG. 20B. The outer ring 650, partially encircles the magnetic cylindrical posts and forms a copper ring encircling all the posts. There are eight copper pads partially encircling the magnetic cylindrical posts isolated from each other and from the outer ring, 650. These copper pads are, 666, 668, 670, 672, 674, 676, 678 and 680. The rectifier means are connected with the anode to the copper ring, 650 and with the cathode to each of the copper pads. For example, SR1 is connected with the anode to the copper ring, 650 and with the cathode to the pad 666.

Figure 21B:
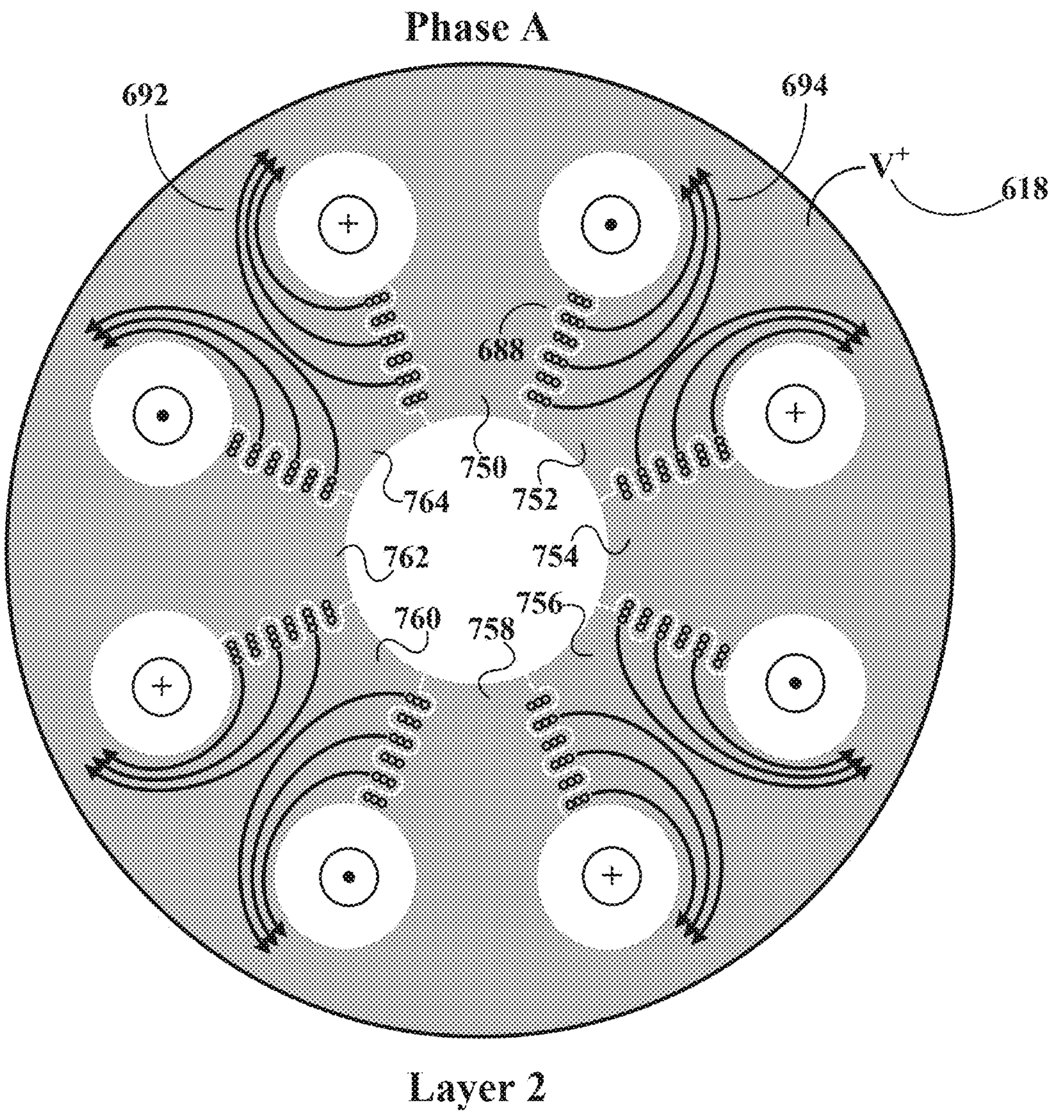
FIG. 21B represents the layout of an inner layer from the multilayer PCB depicted in FIG. 19 and the current flow during phase A.

These copper pads are connected through copper plated vias, such as 688, to another layer which is depicted in FIG. 21B, referred to as Layer 2. On Layer 2 there are eight copper pads which are connected together by an outer ring which is the common electrical connection of all the power cells, V+, 618 as per FIG. 20A and FIG. 20B. The outer ring is further connected to the output inductor 800. The copper pads are isolated from each other from the center of the multilayer PCB, 604, until the cutouts which accommodate the magnetic cylindrical posts.

In FIG. 21A is depicted the current flow through the copper pads during the Phase A when M3, 612, and M2, 610 are conducting. The current is split per each power cell. In the cell 1, the current flows via SR1, 628, from the outer ring, GND, 650, to the anode to the cathode of SR1, 628, and further to the vias, which connect the copper pad 666 from layer 1 to the copper pads 752 and 764 from layer 2, current which will encircle the magnetic post 700 and 714. The current path on layer 1, 690 and the current path on layer 2, 692 and 694 do encircle the post 700 and post 714.

In one of the embodiments presented herein, the output current is split by the number of cells, reducing the current density through the copper per each layer.

Another key embodiment is that the current will flow freely through the copper following the minimum impedance and to cancel the magnetic field produced by the primary winding. This leads to a very low leakage inductance between primary and secondary. In prior art with a discrete secondary wire, the current flow is constrained within the physical boundary of the wire. Here, without limiting or defining the scope of this disclosure in anyway, the current is distributed in the copper plane. This optimally cancels the magnetic field produced by the primary winding.

For the magnetic structure with eight cylindrical posts depicted in FIG. 19, in Phase A, the current flows through SR1, 628, SR2, 680, SR3, 684 and SR4, 644, on the layer 1. On the layer 2, depicted in FIG. 21B the current flows towards the outer ring, V+, 618 through the copper pads, 752, 756, 760 and 764.

Figure 22A:
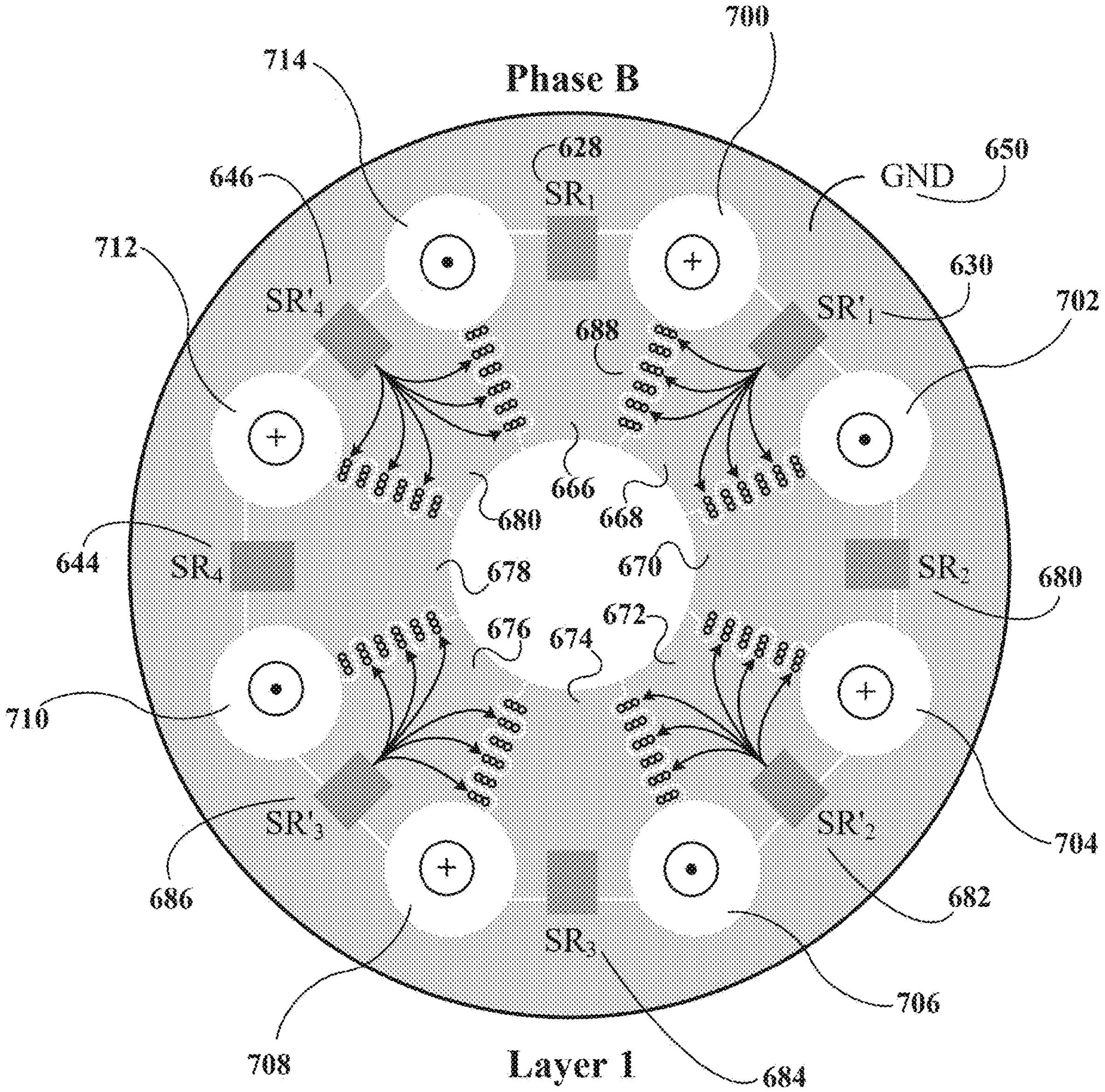
FIG. 22A represents the layout on the top layer of the multilayer PCB depicted in FIG. 19 and the current flow during the phase B.

In FIG. 22A is depicted the current flow through the copper pads during the Phase B when M1, 608, and M4, 614 are conducting. The current is also split per each power cell as it does in Phase A. In the cell 1, the current flows via SR1', 630, from the outer ring, 650, which is the GND, from the anode to the cathode of SR1', and further to the vias, which connect the copper pad 668 to the copper pads 750 and 754, current which will encircle the magnetic post 700 and 702.

Figure 22B:
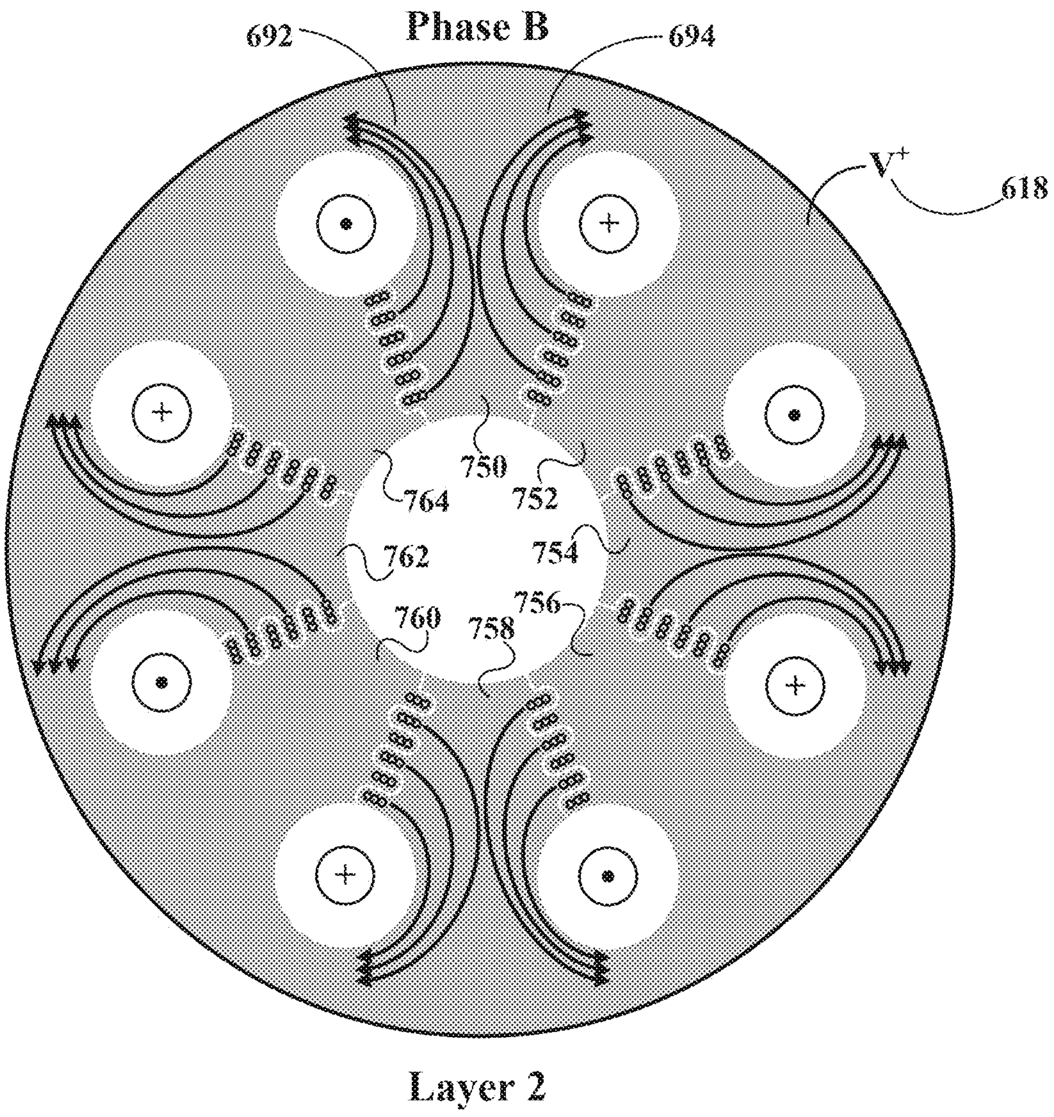
FIG. 22B represents the layout of an inner layer from the multilayer PCB depicted in FIG. 19 and the current flow during phase B.

For the magnetic structure with eight cylindrical posts depicted in FIG. 19, in Phase B, the current flows through SR1', 630, SR2', 682, SR3', 686 and SR4', 646, on the layer 1. On the layer 2, as depicted in FIG. 22B the current flows towards the outer ring, V+, 618 through the copper pads, 750, 754,758, and 762.

Figure 23A:
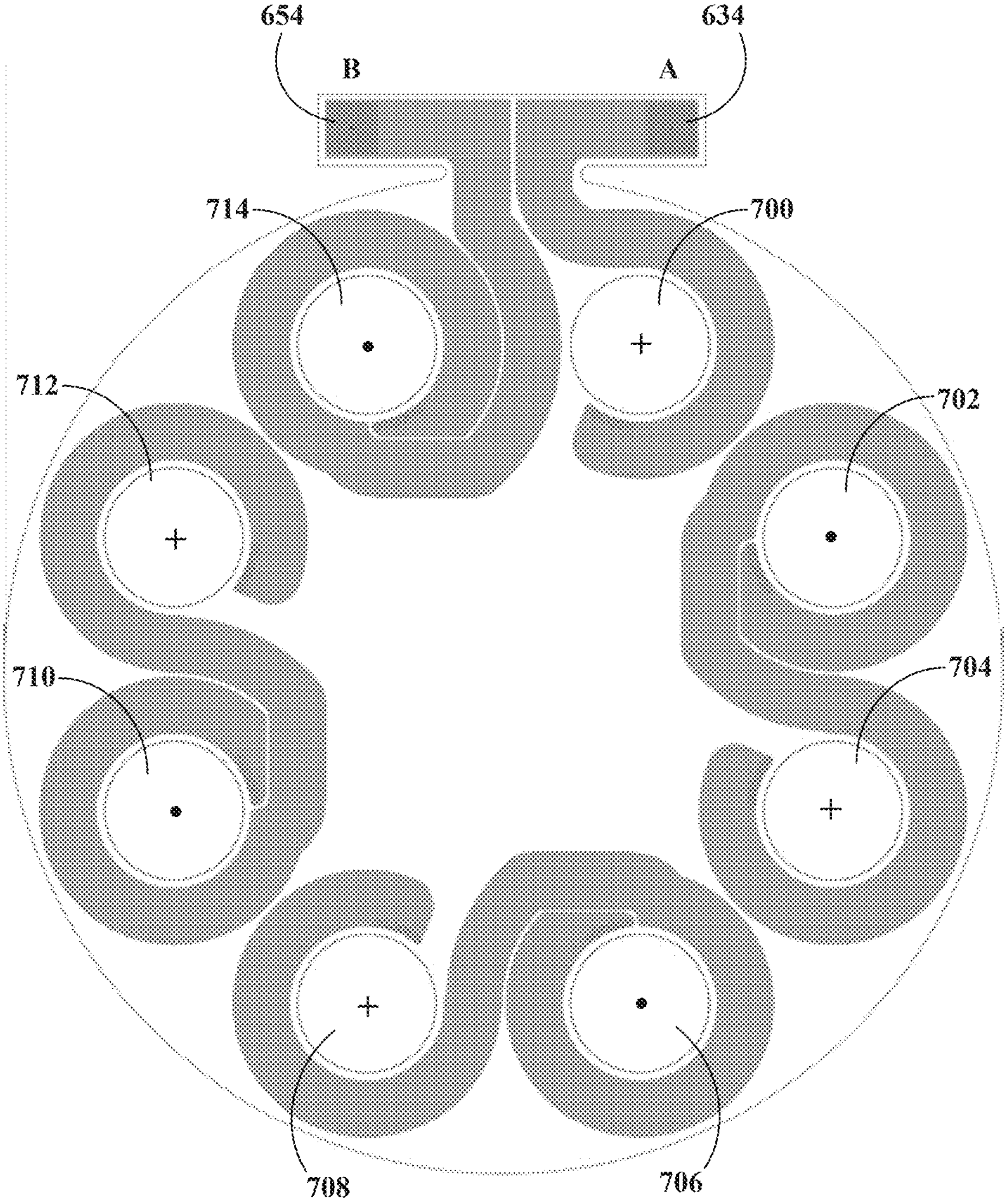
FIG. 23A represents the layout of half of a primary winding on one of the inner layers of the multilayer PCB depicted in FIG. 19.
Figure 23B:
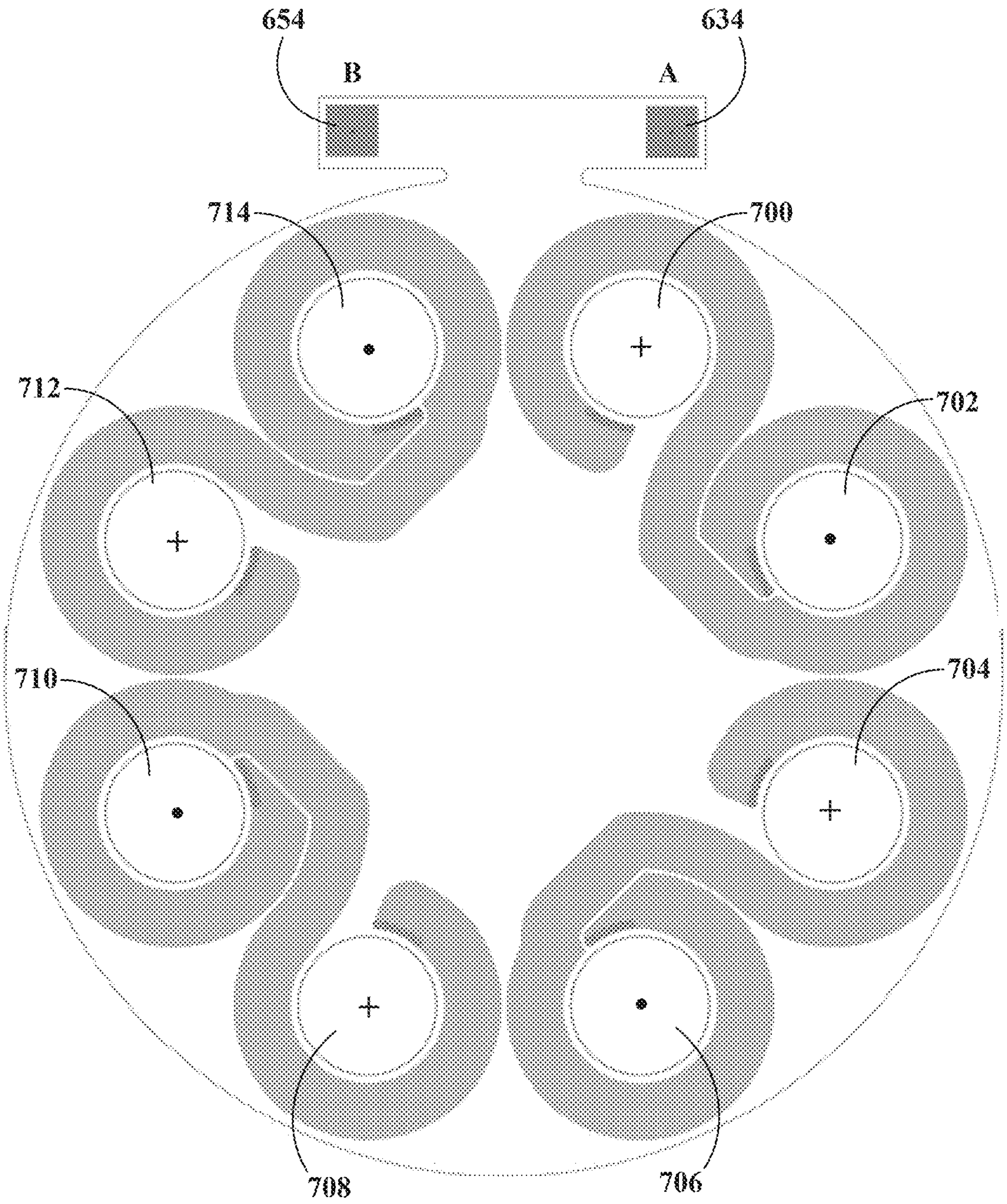
FIG. 23B represents the layout of the second half of primary winding on an inner layers of the multilayer PCB depicted in FIG. 19.

In FIG. 23A is presented the primary winding of the transformer depicted in FIG. 20. The primary winding is wound around each post as depicted in FIG. 23A and FIG. 23B. The polarity of the magnetic field induced during Phase A by the primary winding is also depicted in FIG. 23A and FIG. 23B. The connection to switching node A, 634 and switching node B, 654 is also presented from FIG. 20A and FIG. 20B.

The primary windings are placed on layer 3 and layer 4. The secondary windings depicted in FIGS. 21A and 21B and FIG. 22A and FIG. 22B are on layer 1 and on the layer 2. However, for an interleaved implementation, in which the magnetic field intensity in between primary and secondary is reduced, an additional two layers with the layout of layer 1 and layer 2 has to be added on the other side of the layer 3 and layer 4. In conclusion the secondary windings depicted in FIG. 22A and FIG. 21B sandwich the primary windings located on layer 3 and layer 4. In one option, eight synchronized rectifiers are placed on one side and another eight on the other side of multilayer PCB. In some applications, if a larger leakage inductance is required, placement is split, and on one surface layer is placed the SR1, SR2, SR3 and SR4. and then on the second surface layer, SR1', SR2', SR3', SR4'. In such a configuration during phase A the SRs on only one surface of the multilayer PCB, 604, will conduct and in the phase B the SRs on the opposite surface of the multilayer PCB, 604, phase layer will conduct. Another solution wherein we maintain a very low functional leakage inductance and reduce the number of synchronous rectifiers is placing the SRs from two power cells on one surface of the multilayer PCB and the SRs from another two power cells on the other surface of the multilayer PCB. For example, on one side of the multilayer PCB we place SR1, SR1' and SR3 and SR3'. And on the opposite side of the multilayer PCB, SR2, SR2' and SR4 and SR4'. Such a configuration would be suitable for lower power application wherein 16 SRs would not be an economic choice.

The magnetic structures presented herein, are suitable not only for Full bridge phase shifted topology but also for conventional half bridge and full bridge topologies with and without current injection. The low leakage inductance which is one of the key advantages of these magnetic strictures eliminates one of the key disadvantages of the convention half and full bridge topology. By using "Rompower current injection technology" presented in U.S. Pat. No. 10,574,148, the conventional half bridge and full bridge topology can have zero voltage switching while eliminating some drawbacks of the full bridge phase shifted topology. The full bridge phase shifted topology has the drawback of an increased RMS current through the primary switching elements. In addition to that the switching nodes A (634) and B (654) do not move in antiphase as it is the case in conventional half bridge and full bridge topology. As a result, a shield may be needed in between the primary winding and secondary winding to reduce the Common Mode EMI. In conventional half bridge and full bridge topology the switching node B (654) and switching node A (634) move towards the primary GND (649) in antiphase. While the voltage in switching node B (654) versus the primary GND (649) increases, the voltage in node A (634) decreases towards the primary GND (649). In such a case, the winding arrangements of the primary winding and secondary winding can be made in a such way that the displacement current injected from the primary winding into the secondary wining can be cancelled by the displacement current of opposite polarity from the primary winding to the secondary winding. The displacement current is the current injected through physical capacitance between the winding. In conclusion, by employing the magnetic structures presented herein, the leakage inductance is reduced substantially, and combining the magnetic structure disclosed herein, together with Rompower current injection technology, the conventional full bridge topology becomes more attractive in respect of performance than the full bridge phase shifted topology. The introduction on a larger scale of the full bridge phase shifted topology in the early 1990s was due at that time for the reason of recycling the leakage inductance energy and due to the fact that energy was used to obtain zero voltage switching across the primary switching elements of the full bridge. The significant reduction of the leakage inductance in the transformer by using the magnetic structure presented herein, together with the use of Rompower current injection technology, makes the conventional full bridge topology a better solution than the full bridge phase shifted topology, which was a preferred solution for more than 30 years.

The general concept of one of the parent applications to this specification, and without limiting or defining that application or this specification in any way, but rather only to provide a very quick summary of some embodiments, was to create new magnet core structures, with advantages in respect of key magnetic parameters such as leakage inductance in the transformers, lower core volume for a given cross-section and higher efficiency and solutions to minimize the gap effect in transformers and minimize the and gap effect in inductive elements.

Figure 24:
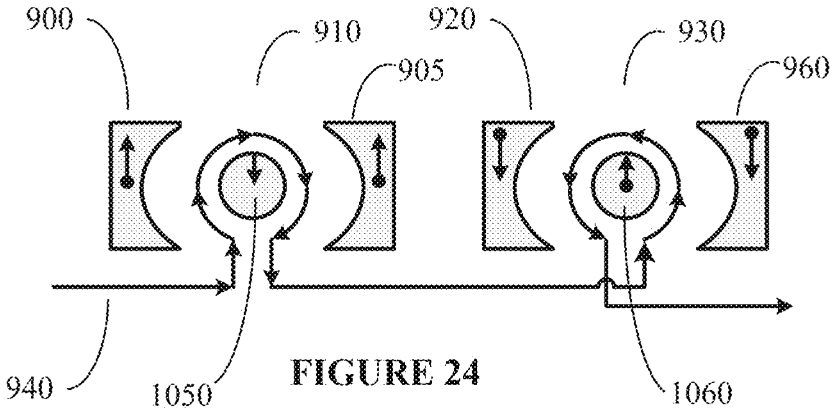
FIG. 24 illustrates two magnetic cores and two windings around a center post of the magnetic cores and the polarity of the magnetic field through each leg of the two cores.

The embodiments of this specification can apply to transformers and also to inductive elements. In FIG. 24, two E shape cores, 910 and 930 are shown, each one contains a central post and two outer legs, the core in the left side, 910 has a central post, 1050 and two outer legs 900 and 905, and the magnetic core in the right, 930 has a central post 1060 and two outer leg 920 and 960.

A winding 940 is wound around the center post magnetic core on the left, 910 and around the center post of the core on the right, 930, while the winding sense around the second center post, 1060 is in opposite direction of the winding sense around the first center post, 1050. In FIG. 24 is depicted also the polarity of the magnetic field in the center leg and in the outer legs for a current flow through the winding 940 as depicted. It is noticeable that the polarity of the magnetic field in the right leg, 905, of the magnetic core on the left, 910, has the opposite polarity of the magnetic field through the left leg, 920, of the core on the right, 930.

Figure 25:
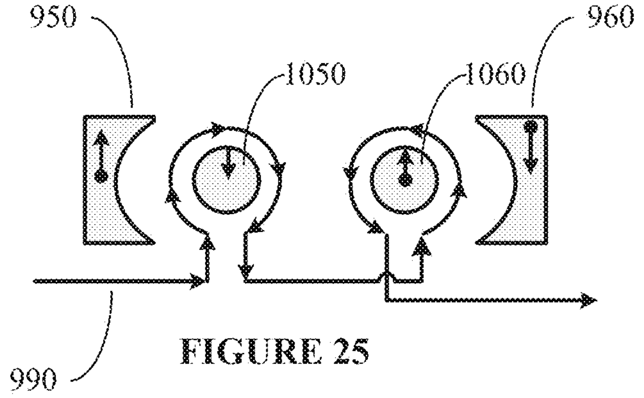
FIG. 25 illustrates the merge of the cores depicted in FIG. 24.

Because the magnetic field in the right leg, 905, of the core in the left, 910, is opposite in polarity to the magnetic field through the left leg, 920, of the core in the right, 930, the two cores can merge, and the magnetic structure depicted in FIG. 25 is created wherein the outer leg, 905 and the outer leg, 920 can be removed. This eliminates two outer legs and reduces the core volume of the new magnetic structure depicted in FIG. 25.

Figure 26:
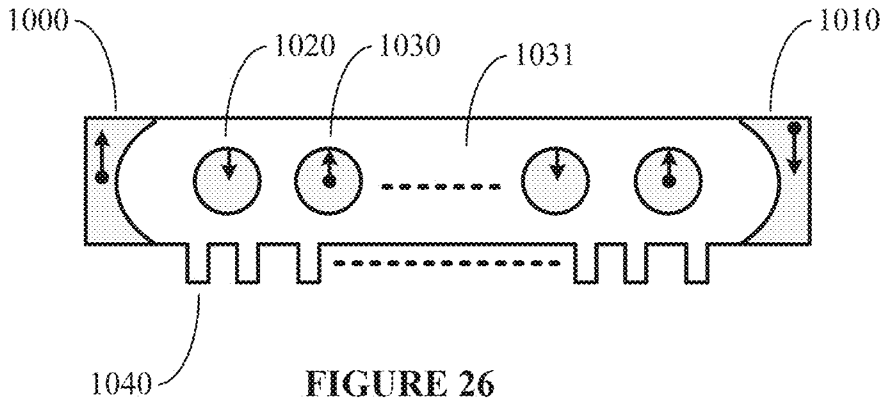
FIG. 26 illustrates an in line multiple inner posts magnetic structure.

The same logic can apply to a larger number of cores in line as depicted in FIG. 26. To be able to do this, the winding which surrounds the center post per each core should create a magnetic field through each post which has the opposite polarity of the magnetic field of the adjacent posts. In FIG. 26 the winding is embedded in a multilayer PCB structure 1031. In FIG. 26 we have a novel magnetic core formed by a chain of inner posts such as 1020, 1030 and so on, wherein the magnetic field through each of the posts have the same amplitude and of opposite polarity to the adjacent post. There are also two outer posts 1000 and 1010 which have a magnetic field of opposite polarity to the post adjacent to it and half amplitude. The cross-section of the outer legs 1000 and 1010 it is smaller than the cross-section of the inner legs, 1020, 1030 and so on, and said cross-section of the outer legs can be between half of the cross-section of the inner legs to the cross-section of the inner legs.

Figure 28A:
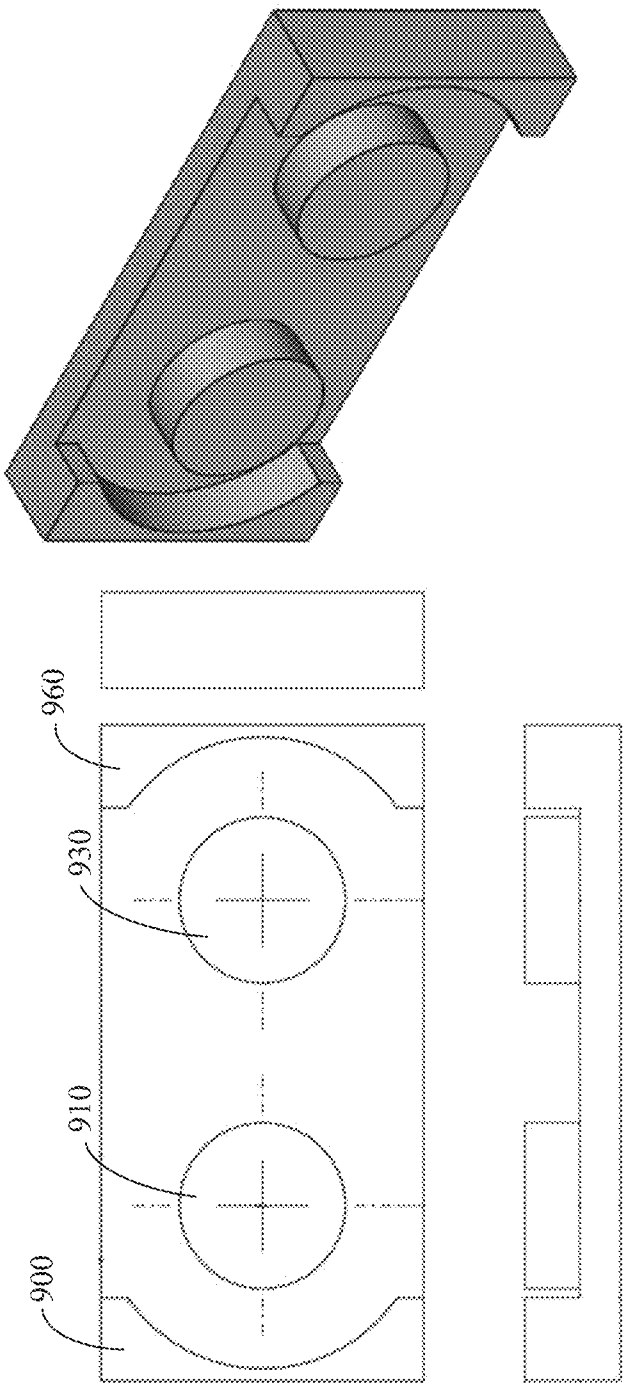
FIG. 28A illustrates a dual inner leg magnetic core in plan, side, front, and perspective views.
Figure 28B:
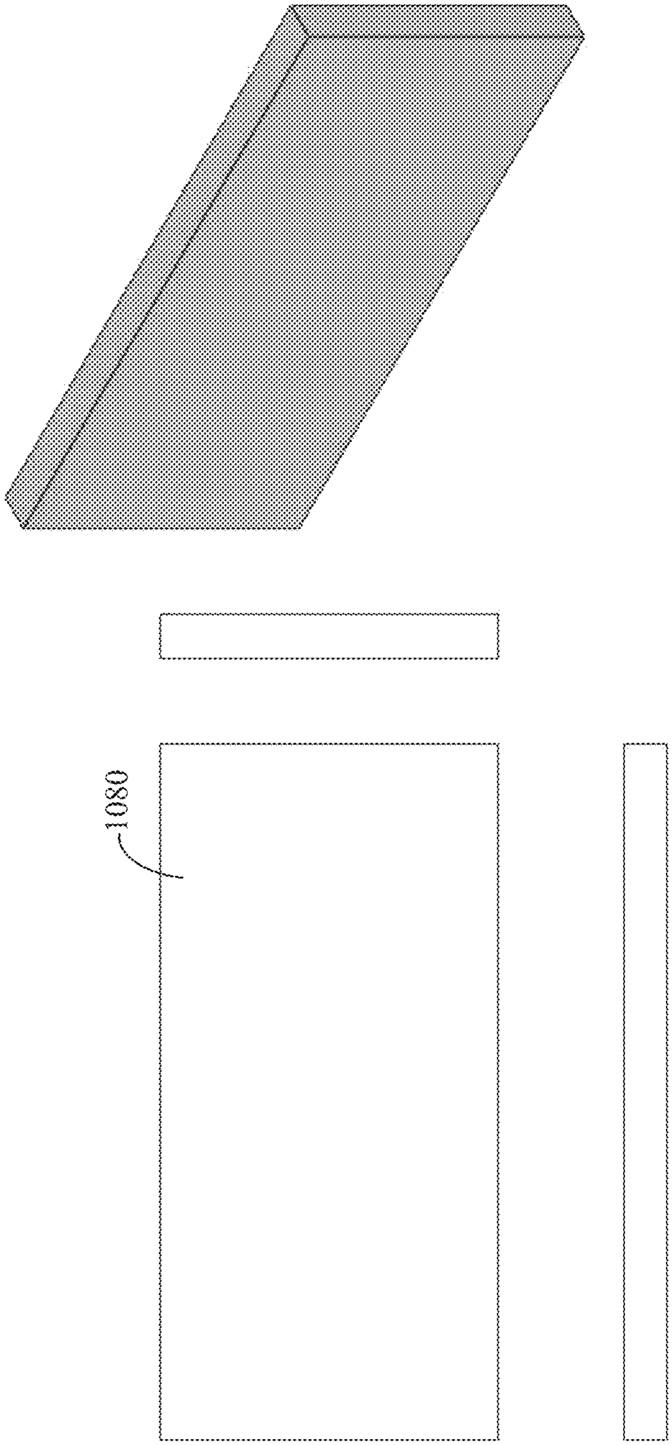
FIG. 28B illustrates an I section core which is used together with the magnetic core from FIG. 28A, shown in plan, side, front, and perspective views.

In FIG. 28A is presented the mechanical drawing of a core having two inner posts, 910 and 930 posts and two outer legs, 900 and 960. The cross sections of the outer posts are half of the cross section of the inner posts; in other embodiments, the cross sections of the outer posts are equal to those of the inner posts, and in other embodiments, the cross sections of the outer posts are between half of and equal to the cross sections of the outer posts. This new magnetic structure, is referred to herein as "dual inner posts, E core." A complete magnetic core can be formed by using two "dual inner post E core" or by using only one "dual inner posts E core" structure together with an I plate, 1080 as depicted in FIG. 28B.

Figure 27:
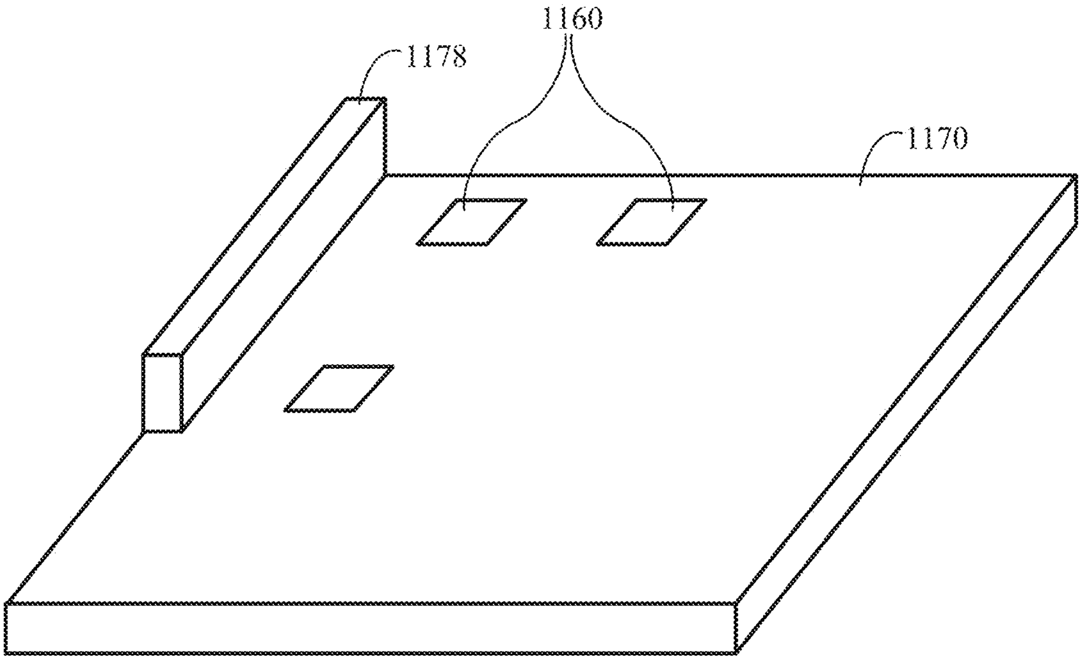
FIG. 27 illustrates packaging in which the magnetic structure of FIG. 26 is used.

In FIG. 26 the multilayer PCB magnetic structure, 1031, has pins, 1040, which are used for the interconnection with the mother board 1170 as depicted in FIG. 27 and also for mechanical support. In FIG. 27 is presented a simplified package of a power converter which contains a mother board, 1170, several SMD components such as 1160 and a vertically mount magnetic element m 1178. The vertically mount magnetic element can be the magnetic element of FIG. 26, wherein its pins, 1040 are inserted into the mother board 1170. Inductors and transformers may be wound on this novel magnetic core. In FIG. 25 is depicted the dual inner post magnetic core with a winding arrangements for using this novel core as an inductor. The air gap wherein most of the energy is stored can be placed in the inner posts only in most of the applications or can be distributed and placed in the outer legs as well. This novel magnetic structure can be also easy to gap the inner posts, which is a cost advantage. The advantage of using this novel magnetic core which is also referred to herein as "in line multiple inner posts magnetic core", as an inductor is that it creates a distributed gap inductance which will significantly reduce the gap effect wherein the fringe magnetic field cut into the copper winding and leads to power dissipation reducing the efficiency of the inductor.

Another advantage of this multiple inner posts magnetic core is that is shaped in a way wherein we can reduce the diameter of the inner posts and have a low profile vertically mount inductor as depicted in FIG. 27. In vertically mount conventional E core in order to reduce the height, for vertical mounting, is needed to reshape the round center post into an oval shape and the outer legs would be on top and bottom of the low-profile magnetic element, reducing the winding area for a given maximum height specification.

In the "in line multiple inner posts magnetic core" the outer legs are reduced to the left outer leg and the right outer leg and the space in between the inner posts are used for the winding only. This is possible because the magnetic field is weaving through each inner post and through the plates which are attached by the inner posts. Because the magnetic field is weaving though the inner posts and the plates surrounding the inner posts, the magnetic field is mostly parallel the copper winding embedded in the multilayer PCB reducing the proximity losses.

This type of inductive element using the multiple inner posts magnetic core can be used for building the inductive element for the PFC choke or other similar application such as output inductance in buck converters or other type of similar applications. The distributed air gap in the multiple inner posts is a major advantage in such applications, reducing the gap loss and reducing the EMI.

Figure 29:
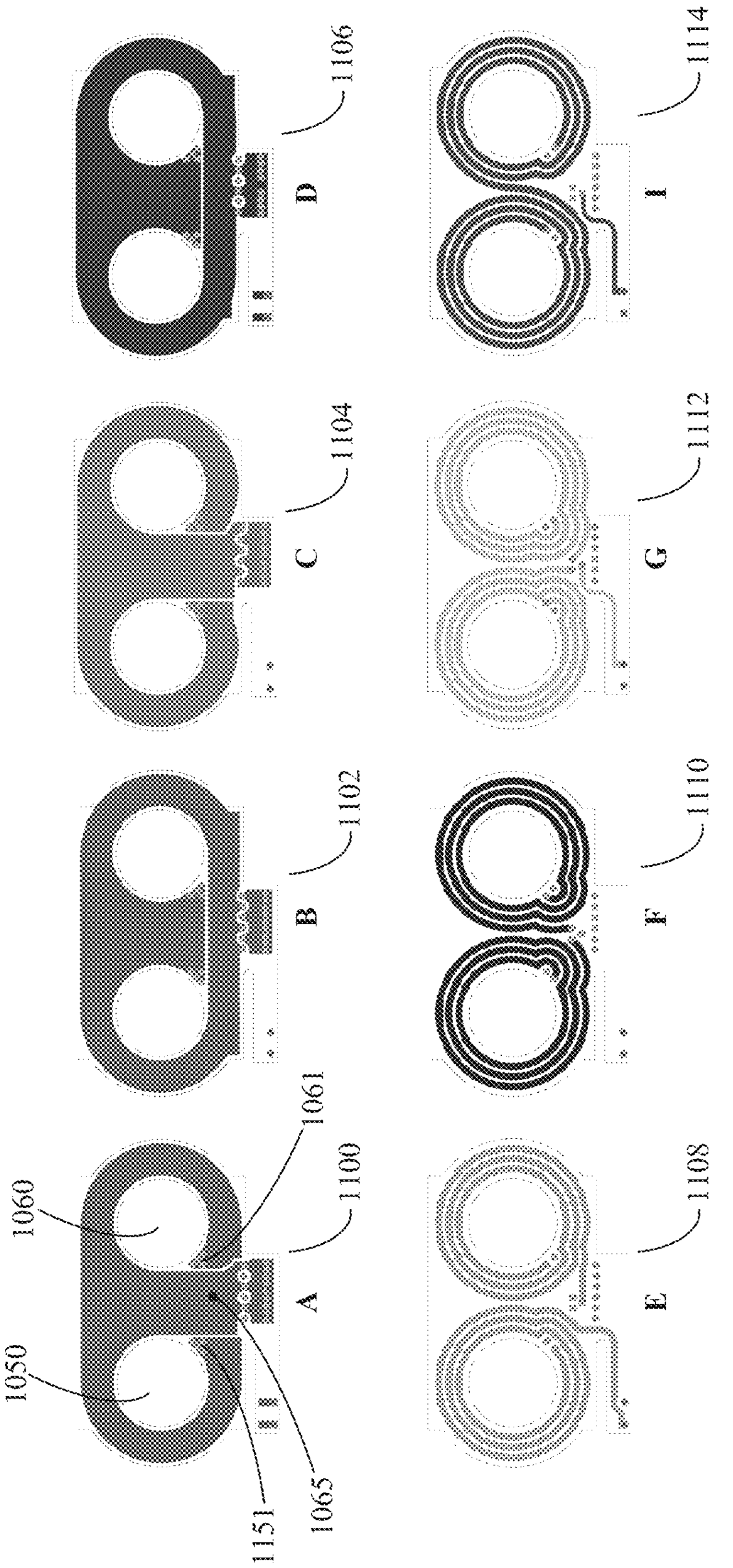
FIG. 29 illustrates the windings in an eightlayer multilayer PCB using the core of FIG. 28A.

The novel magnetic core structure, referred to also as multiple inner posts magnetic core, can be used also in transformer structures such as one depicted from FIG. 29 wherein the inner layers of the multilayer PCB are presented for a turn ratio of 12:2 per each inner leg. The layers in the multilayer PCB are designed for a dual inner leg structure depicted in FIG. 25.

In FIG. 29, layer A, is presented the winding technique for one turn around each inner leg 1050 and 1060. Both windings originate from the trace 1065, located in between the inner posts, 1050 and 1060. The one turn winding around the post 1050 is wound counterclockwise and encircles the inner post 1050 and connected to the via 1051. The other one turn winding around the post 1060 is wound clockwise and encircles the post 1060 and further connects to the via 1061. Both one turn windings encircle the post 1050 and 1060 and continue on the layer B, 1102. The one turn winding encircles the inner post 1050 counterclockwise and the other one turn winding encircles the inner post 1060 clockwise. Both one turn windings form the layer B,1102 are connected together via the trace 1063.

These two turns wound around each inner leg are in parallel with common connection at the trace 1065 at one end and at the trace 1063 at the other end. Using this winding technique on layer A,1100 and layer B, 1102, two turns are wound around each of the inner posts 1050 and 1060 and both of the two turns around each inner posts are in parallel with each other. This winding technique leads to a very low impedance by comparison with standard winding techniques and it is one of the embodiments presented herein.

The primary windings are wound on the layer, E,1108, F, 1110, G, 1112 and I, 1114. There are a total of twelve turns wound around the inner leg 1050, anticlockwise and 12 turn are wound around the post 1060 clockwise. The twelve turns wound around the inner post 10590 are in series with the twelve turns wound around the inner post 1060.

A transformer using the winding technique depicted in FIG. 29, on a dual inner leg, has a very low leakage inductance and a very low dc impedance on the secondary windings in case wherein the winding technique form FIG. 19 is implemented. The secondary windings were embedded in the layer A, 1100, B, 1102, C, 1104 and D, 1106.

Figure 30:
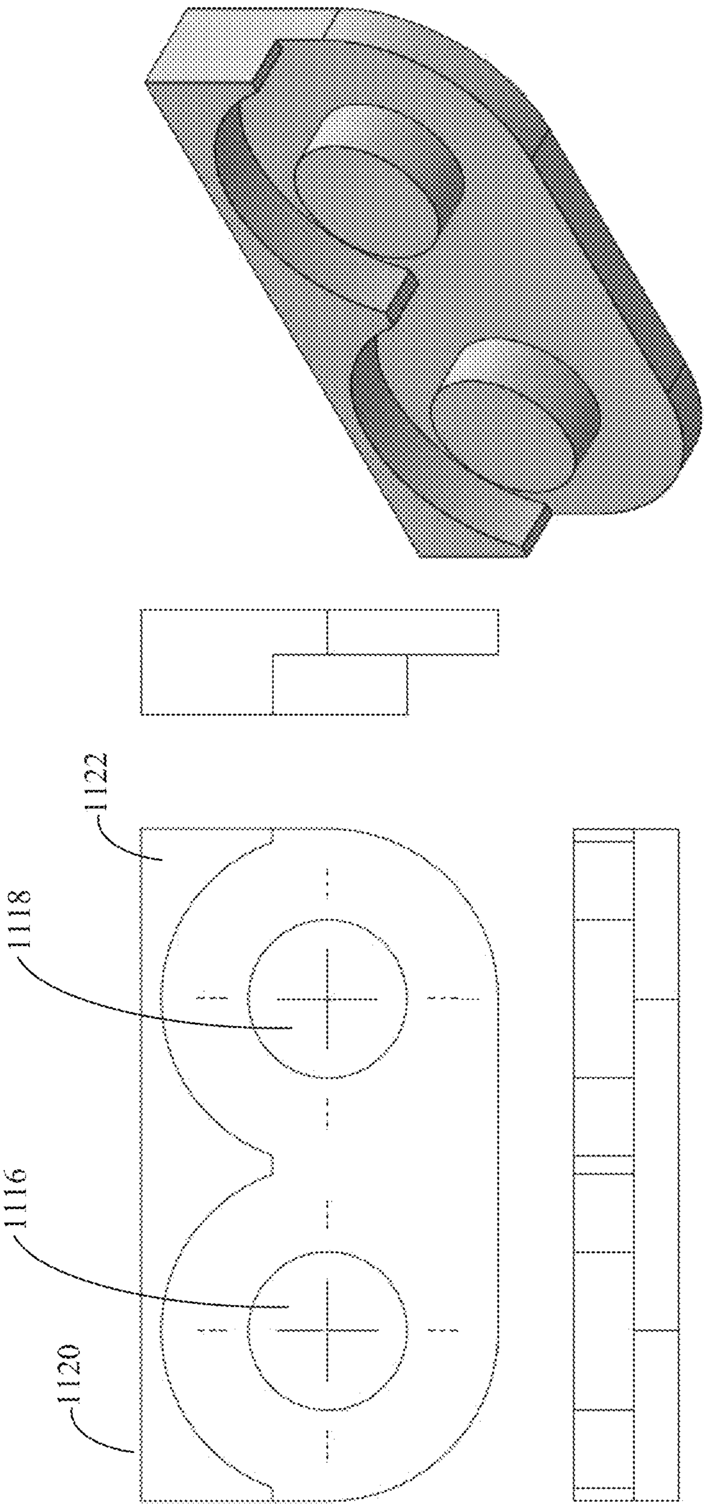
FIG. 30 illustrates another embodiment of the dual inner leg magnetic structure, in plan, side, front, and perspective views.
Figure 31:
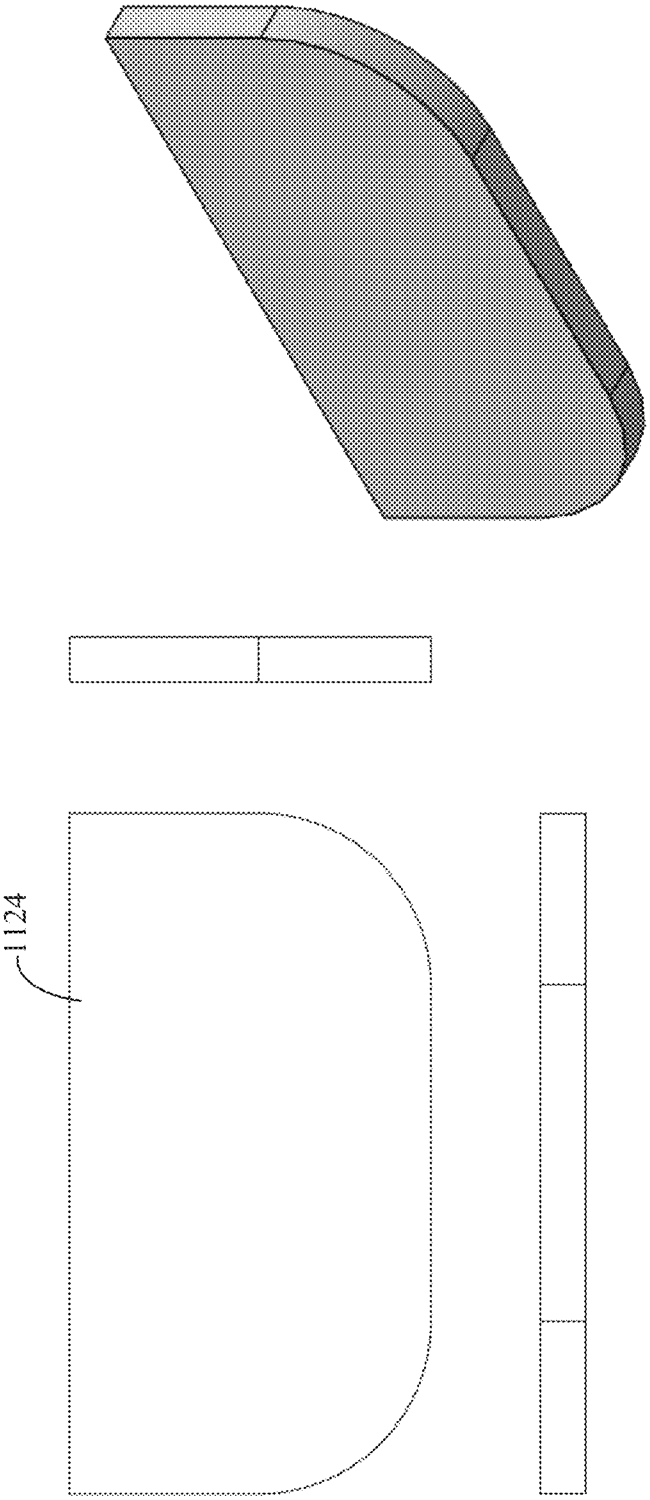
FIG. 31 illustrates the I section of the magnetic core from FIG. 30, in plan, side, front, and perspective views.

In some applications, the outer legs of the dual inner post magnetic structure depicted in FIG. 15 and FIG. 29 (the A layer), are rotated 90 degrees; such a magnetic core is depicted in FIG. 30. In the magnetic structure from FIG. 30 there are two inner posts 1116 and 1118 (shown in plan view in an engineering drawing and in perspective view) and the outer legs 1120 and 1122 are rotated 90 degrees. This magnetic structure has all the properties of the in line dual center post and has the advantage of a reduced length. In FIG. 31, is depicted the I s-ection, 1124, associated with magnetic structure depicted in FIG. 30.

Figure 32A:
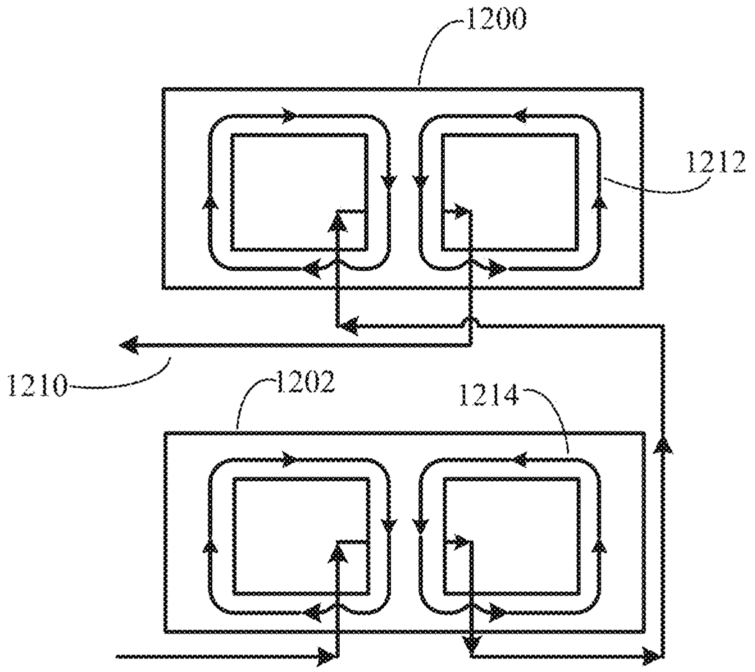
FIG. 32A is an electrical schematic illustrating two magnetic cores and two winding around the center post of the magnetic cores and the polarity of the magnetic field through each leg of the two cores.
Figure 32B:
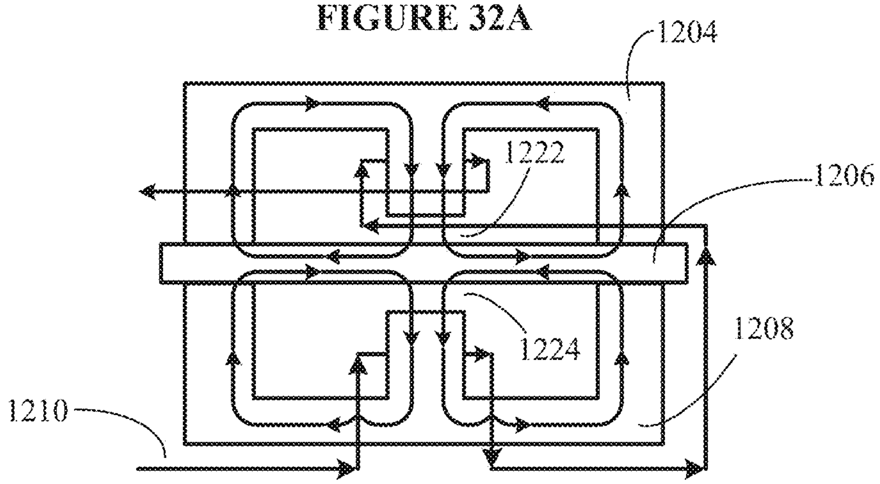
FIG. 32B is an electrical schematic illustrating the merge of the cores depicted in FIG. 32A.

In FIG. 32A are depicted two magnetic cores 1200 and 1202. A winding 1210 is wound around the center post of the core 1202 and around the center post of 1200. The magnetic field is produced in both cores, 1212 in the core 1200 and 1214 in the core 1202. In the event the core 1200 is placed on top of the core 1202 the magnetic field through the bottom side of the core 1200 is in opposite direction of the magnetic field through the top section of the magnetic core 1202. As a result, a core structure can be described by merging the cores 1200 and the core 1202, and this magnetic structure is formed by the core 1204, the magnetic plate 1206 and the core 1208. The magnetic field through 1206 is very small because the magnetic field produced by the winding 1210 in the core 1208 it is in opposite direction of the magnetic field produced by the winding 1210 through the core 1204. The plate 1206 can be much thinner than the plates of the cores 1204 and core 1208. The winding 1210 can be conventional winding or can be embedded in multi-layer PCB in the way is depicted in FIG. 32C.

Figure 32C:
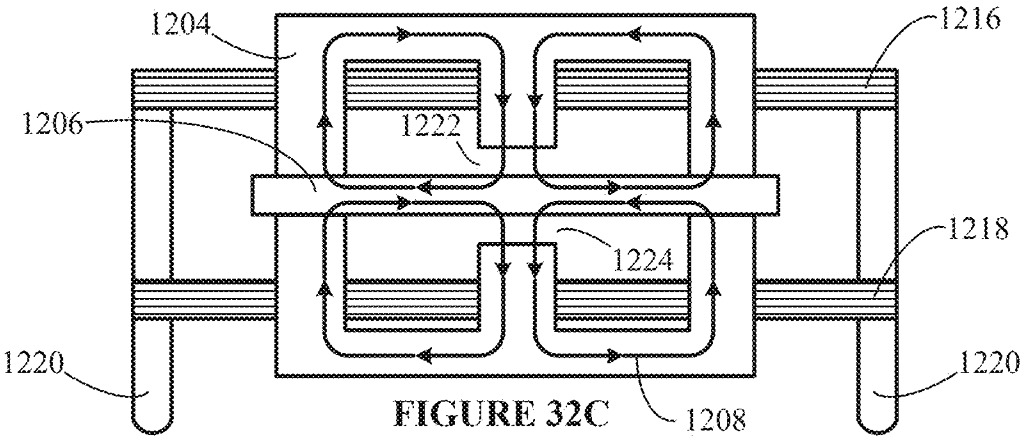
FIG. 32C is an electrical schematic illustrating the magnetic structure depicted in FIG. 32B wherein the windings are embedded in two multilayer PCB.

In FIG. 32C the winding 1210 is embedded in two multilayer PCB 1216 and 1218. The pins 1220 merge the connection between the winding embedded in multilayer PCB 1216 and 1218 and the mother board.

By merging two magnetic cores when the magnetic field in the bottom of one core is it in of opposite polarity of the magnetic field through the top of the second core, the plates which are connected can be reduced in size because the magnetic field is cancelled. The common plate 1206 can be totally removed but, in many applications, it is kept in order to accommodate two air gaps such as 1222 and 1224 from FIG. 32B and FIG. 32C.

The invention claimed is:

1. A magnetic and electrical circuit element, comprising:

a group of identical magnetic-flux-conducting posts placed between two continuous magnetic flux conductive plates, each plate shaped to ensure a continuous flow of magnetic field successively through adjacent magnetic-flux-conductive posts;

a multi-layer structure formed with an electrically-conductive material, said multi-layer structure including multiple layers forming a stack of layers along a length of the posts, said multi-layer structure configured as primary and secondary windings of a transformer, and other auxiliary windings;

the primary winding is embedded in the multi-layer structure and wound around the magnetic-flux-onducting posts in such a way that a magnetic field induced in each of the magnetic-flux-conducting posts has a magnetic field polarity opposite to a polarity of the respective magnetic field of the magnetic-flux-conducting post adjacent the respective magnetic-flux-conducting post;

around each of the magnetic-flux-conducting posts, there is at least one secondary winding which is connected to a semiconductor device, and said semiconductor device is disposed on the multi-layer structure.

2. The magnetic and electrical circuit element of claim 1, wherein the posts are arranged along a closed loop.

3. The magnetic and electrical circuit element of claim 2, wherein the closed loop is a circle.

4. The magnetic and electrical circuit element of claim 2, wherein the closed loop is a rectangle.

5. The magnetic and electrical circuit element of claim 2, wherein the closed loop is a square.

6. The magnetic and electrical circuit element of claim 1, wherein a current flowing through the semiconductor device connected to the secondary winding substantially cancels significantly the magnetic field induced in the magnetic-flux-conducting posts by a current flowing through the primary winding.

7. The magnetic and electrical circuit element of claim 1, wherein the primary winding is connected to at least one semiconductor device.

8. The magnetic and electrical circuit element of claim 1, further comprising:

a continuous ring, made of a conductive material, which encircles from outside all of the magnetic-flux-conducting posts;

a current flows through the semiconductor device to the continuous ring; and the semiconductor device is connected to copper pads placed between adjacent magnetic-flux-conducting posts, wherein the current flowing through the semiconductor device encircles each of the magnetic-flux-conducting posts.

9. The magnetic and electrical circuit element of claim 8, wherein the copper pads are contained in at least two layers of the multi-layer structure, and the current flows through the copper pads.

10. The magnetic and electrical circuit element of claim 1, wherein a current flows through electrically conductive pads freely to form an optimum path to cancel the magnetic field induced in the magnetic-flux-conducting posts by the current flowing through the primary winding.

11. The magnetic and electrical circuit element of claim 1, further comprising a current injection winding wound around each of the magnetic-flux-conducting posts on an optimum path of the current flowing through the semiconductor device.

* * * * *